(12) United States Patent
Takimoto

(10) Patent No.: US 11,169,390 B2
(45) Date of Patent: Nov. 9, 2021

(54) LENS DRIVING DEVICE, CAMERA MODULE, AND CAMERA MOUNTING APPARATUS

(71) Applicant: Yukihiro Takimoto, Tokyo (JP)

(72) Inventor: Yukihiro Takimoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 275 days.

(21) Appl. No.: 16/148,094

(22) Filed: Oct. 1, 2018

(65) Prior Publication Data

US 2019/0101771 A1 Apr. 4, 2019

(30) Foreign Application Priority Data

Sep. 29, 2017 (JP) .............................. JP2017-189293

(51) Int. Cl.
| | | |
|---|---|---|
| *G02B 27/64* | (2006.01) | |
| *G02B 7/09* | (2021.01) | |
| *G03B 13/36* | (2021.01) | |
| *G03B 5/04* | (2021.01) | |
| *G02B 7/08* | (2021.01) | |
| *H02K 41/035* | (2006.01) | |
| *G02B 13/00* | (2006.01) | |

(52) U.S. Cl.
CPC ............ *G02B 27/646* (2013.01); *G02B 7/08* (2013.01); *G02B 7/09* (2013.01); *G03B 5/04* (2013.01); *G03B 13/36* (2013.01); *G02B 13/001* (2013.01); *G03B 2205/0015* (2013.01); *G03B 2205/0069* (2013.01); *H02K 41/0356* (2013.01)

(58) Field of Classification Search
CPC . G02B 7/00; G02B 7/02; G02B 7/021; G02B 7/023; G02B 7/09; G02B 27/64; G02B 27/646; G03B 13/36; G03B 5/04
USPC .................. 359/554–557, 813–814, 823–824
See application file for complete search history.

(56) References Cited

U.S. PATENT DOCUMENTS

| 2005/0258502 A1 | 11/2005 | Kong |
| 2010/0060994 A1 | 3/2010 | Akabane |
| 2015/0301304 A1 | 10/2015 | Oh |

(Continued)

FOREIGN PATENT DOCUMENTS

| CN | 101666900 A | 3/2010 |
| CN | 106662790 A | 5/2017 |

(Continued)

*Primary Examiner* — Thong Q Nguyen
(74) *Attorney, Agent, or Firm* — Brundidge & Stanger, P.C.

(57) ABSTRACT

A lens driving device includes: a fixing part; a movable part; and an actuator configured to displace the movable part in a direction orthogonal to the optical axis direction; in which the fixing part includes a coil substrate, a base member made of a non-conductive material, the base member including a base side through hole, and a terminal member made of a conductive material and partially embedded in the base member, the terminal member including a first connecting part serving as an external terminal and a second connecting part configured to be connected with the coil substrate, and in which in plan view in the optical axis direction, the second connecting part and the base side through hole are disposed to overlap each other, and the second connecting part and the coil substrate are connected by a solder provided inside the base side through hole.

10 Claims, 23 Drawing Sheets

(56) References Cited

U.S. PATENT DOCUMENTS

| | | |
|---|---|---|
| 2015/0331220 A1 | 11/2015 | Shikama |
| 2016/0014339 A1 | 1/2016 | Miller |
| 2017/0115466 A1 | 4/2017 | Murakami et al. |
| 2017/0146769 A1 | 5/2017 | Huang |
| 2017/0254979 A1 | 9/2017 | Bai |
| 2018/0356610 A1* | 12/2018 | Chen .................. G02B 7/08 |
| 2018/0364445 A1* | 12/2018 | Osaka .................. H01L 43/06 |
| 2019/0011614 A1* | 1/2019 | Park .................. H04N 5/2257 |
| 2019/0204531 A1* | 7/2019 | Sugawara ............. G03B 5/02 |

FOREIGN PATENT DOCUMENTS

| | | |
|---|---|---|
| JP | 2005-333142 A | 12/2005 |
| JP | 2015-014701 A | 1/2015 |
| JP | 2015-145931 A | 8/2015 |
| JP | 2017-099273 A | 6/2017 |
| WO | 2016/006168 A1 | 1/2016 |

\* cited by examiner

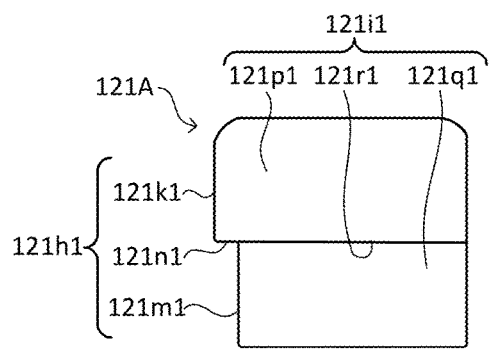
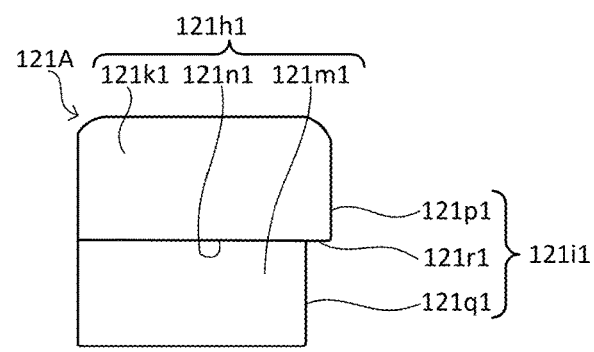
FIG. 13A      FIG. 13B
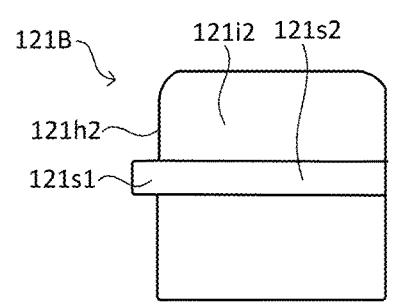
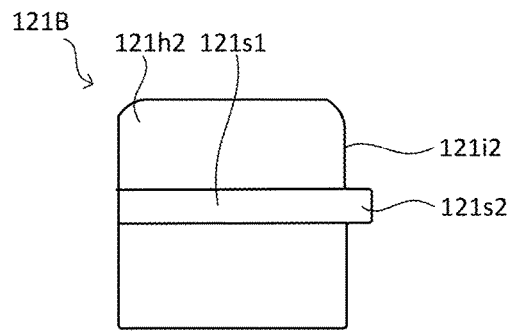
FIG. 14A      FIG. 14B

| | CONNECTING TERMINAL | LAND | CONNECTION DESTINATION |
|---|---|---|---|
| CONNECTION 1 | HALL DEVICE TERMINAL ELEMENT 272a | FIRST LAND 211a | HALL DEVICE 23A |
| CONNECTION 2 | HALL DEVICE TERMINAL ELEMENT 272b | FIRST LAND 211b | HALL DEVICE 23A |
| CONNECTION 3 | HALL DEVICE TERMINAL ELEMENT 272c | FIRST LAND 211c | HALL DEVICE 23A |
| CONNECTION 4 | HALL DEVICE TERMINAL ELEMENT 272d | FIRST LAND 211d | HALL DEVICE 23A |
| CONNECTION 5 | HALL DEVICE TERMINAL ELEMENT 272e | FIRST LAND 211e | HALL DEVICE 23B |
| CONNECTION 6 | HALL DEVICE TERMINAL ELEMENT 272f | FIRST LAND 211f | HALL DEVICE 23B |
| CONNECTION 7 | HALL DEVICE TERMINAL ELEMENT 272g | FIRST LAND 21g | HALL DEVICE 23B |
| CONNECTION 8 | HALL DEVICE TERMINAL ELEMENT 272h | FIRST LAND 211h | HALL DEVICE 23B |
| CONNECTION 9 | COIL TERMINAL ELEMENT 271a | SECOND LAND 212a | OIS COIL 22A |
| CONNECTION 10 | COIL TERMINAL ELEMENT 271b | SECOND LAND 212b | OIS COIL 22B |
| CONNECTION 11 | COIL TERMINAL ELEMENT 271c | SECOND LAND 212c | OIS COIL 22C |
| CONNECTION 12 | COIL TERMINAL ELEMENT 271d | SECOND LAND 212d | OIS COIL 22D |

FIG. 25

LENS DRIVING DEVICE, CAMERA MODULE, AND CAMERA MOUNTING APPARATUS

CROSS REFERENCE TO RELATED APPLICATIONS

This application is entitled to and claims the benefit of Japanese Patent Application No. 2017-189293, filed on Sep. 29, 2017, the disclosure of which including the specification, drawings and abstract is incorporated herein by reference in its entirety.

TECHNICAL FIELD

The present invention relates to a lens driving device, a camera module, and a camera mounting apparatus.

BACKGROUND ART

Conventionally, various lens holder driving devices for capturing a clear image by preventing blurring on the imaging surface even with hand shake (vibration) when capturing an image of a still picture have been proposed.

For example, PTL 1 discloses a hand shake correction device in which a permanent magnet for an auto-focus (AF) lens driving device serves also as a permanent magnet for a hand shake correction device for the purpose of achieving reduction in size and height.

In the hand shake correction device disclosed in PTL 1, the OIS fixing part is separated from the OIS movable part in the light axis direction on the rear side of the OIS movable part serving also as the auto-focusing lens driving device. One ends of (lower ends) a plurality of suspension wires are fixed at the outer periphery part of the OIS fixing part. The other ends (upper ends) of the suspension wires are firmly fixed to the OIS movable part.

In the hand shake correction device disclosed in PTL 1, the OIS fixing part includes a coil substrate that holds the OIS coil, a flexible substrate (hereinafter referred to as "FPC") disposed on the rear side of the coil substrate, and a base member disposed on the rear side of the FPC. The FPC includes, at two sides opposite to each other in a predetermined direction, terminal members bent to the rear side. Each terminal member connects a coil substrate (an OIS coil and/or a Hall device) and an external device such as a power supply device and a control device, for example.

CITATION LIST

Patent Literature

PTL 1
WO2016/006168

SUMMARY OF INVENTION

Technical Problem

Incidentally, in the above-mentioned hand shake correction device disclosed in PTL 1, the FPC is provided between the base member and the coil substrate, and accordingly the thickness of the OIS fixing part is increased by the thickness of the FPC. In view of this, the structure disclosed in PTL 1 has a room for improvement in height reduction.

An object of the present invention is to provide a lens driving device, a camera module, and a camera mounting apparatus which can achieve height reduction.

Solution to Problem

A lens driving device according to an embodiment of the present invention includes: a fixing part; a movable part disposed above the fixing part such that the movable part is separated from the fixing part in an optical axis direction, the movable part being displaceable in a direction orthogonal to the optical axis direction; and an actuator configured to displace the movable part in the direction orthogonal to the optical axis direction. The fixing part includes a coil substrate configured to hold an OIS coil of the actuator, a base member made of a non-conductive material and provided below the coil substrate, the base member including a base side through hole extending in the optical axis direction, and a terminal member made of a conductive material and partially embedded in the base member, the terminal member including a first connecting part serving as an external terminal and a second connecting part configured to be connected with the coil substrate. In plan view in the optical axis direction, the second connecting part and the base side through hole are disposed to overlap each other, and the second connecting part and the coil substrate are connected by a solder provided inside the base side through hole.

A camera module according to an aspect of the present invention includes: the above-mentioned lens driving device; a lens part held by a movable part through a lens barrel; and an image pickup part that picks up a subject image imaged by the lens part.

A camera mounting apparatus according to an aspect of the present invention is an information device or a transport device, the camera mounting apparatus including: the above-mentioned camera module; and a control part that handles image information obtained by the camera module.

Advantageous Effects of Invention

According to the present invention, it is possible to provide a lens driving device, a camera module, and a camera mounting apparatus which can achieve height reduction.

BRIEF DESCRIPTION OF DRAWINGS

FIG. 13A and FIG. 13B illustrate modification 1 of a flow stopper part, FIG. 13A is a schematic view of a part of a stopper protrusion as viewed from the arrow $A_1$ direction of FIG. 12, and FIG. 13B is a schematic view of a part of the stopper protrusion as viewed from the arrow $A_2$ direction of FIG. 12;

FIG. 14A and FIG. 14B illustrate modification 2 of the flow stopper part, FIG. 14A is a schematic view of a part of the stopper protrusion as viewed from the arrow $A_1$ direction of FIG. 12, and FIG. 14B is a schematic view of a part of the stopper protrusion as viewed in the arrow $A_2$ direction of FIG. 12;

FIG. 15A is a schematic view of a part of the stopper protrusion as viewed in the arrow $A_1$ direction of FIG. 12, and FIG. 15B is a schematic view of a part of the stopper protrusion as viewed in the arrow $A_2$ direction of FIG. 12, FIG. 16A and FIG. 16B illustrate modification 4 of the flow stopper part.

FIG. 25 illustrates a connection relationship of a terminal member, a coil substrate, an OIS coil, and a Hall device.

DESCRIPTION OF EMBODIMENTS

An embodiment of the present invention is described below with reference to the accompanying drawings.

Embodiment

Figure 1A:
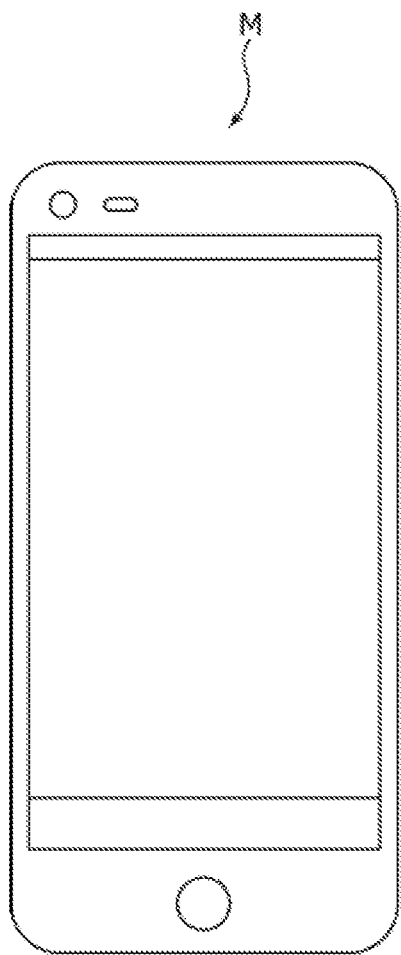
FIG. 1A and FIG. 1B illustrate a smartphone including a camera module according to an embodiment of the present invention.
Figure 1B:
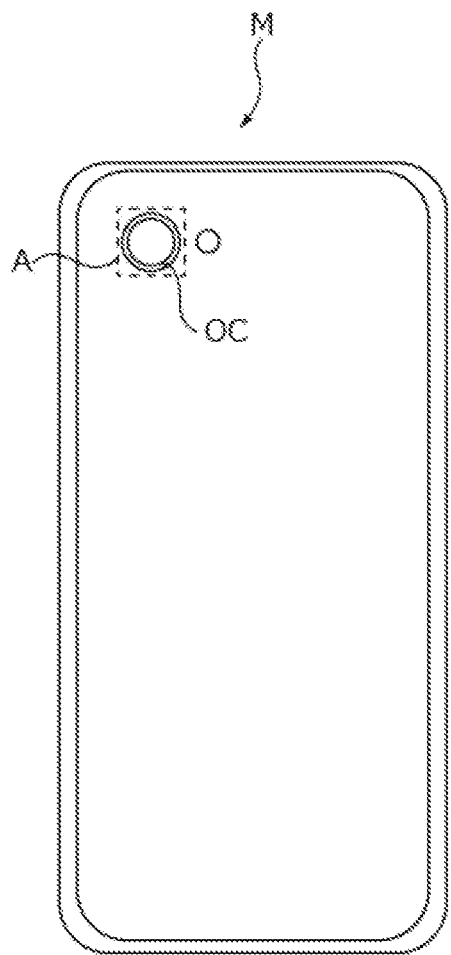
Figure 2:
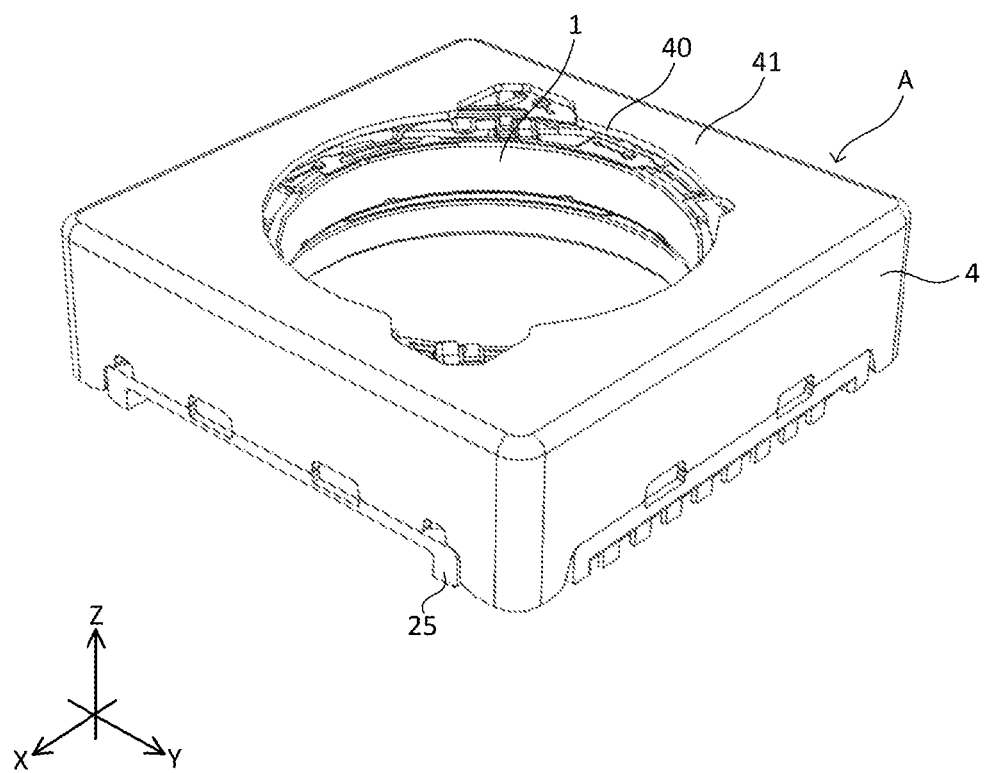
FIG. 2 is a perspective view of an external appearance of the camera module.
Figure 3:
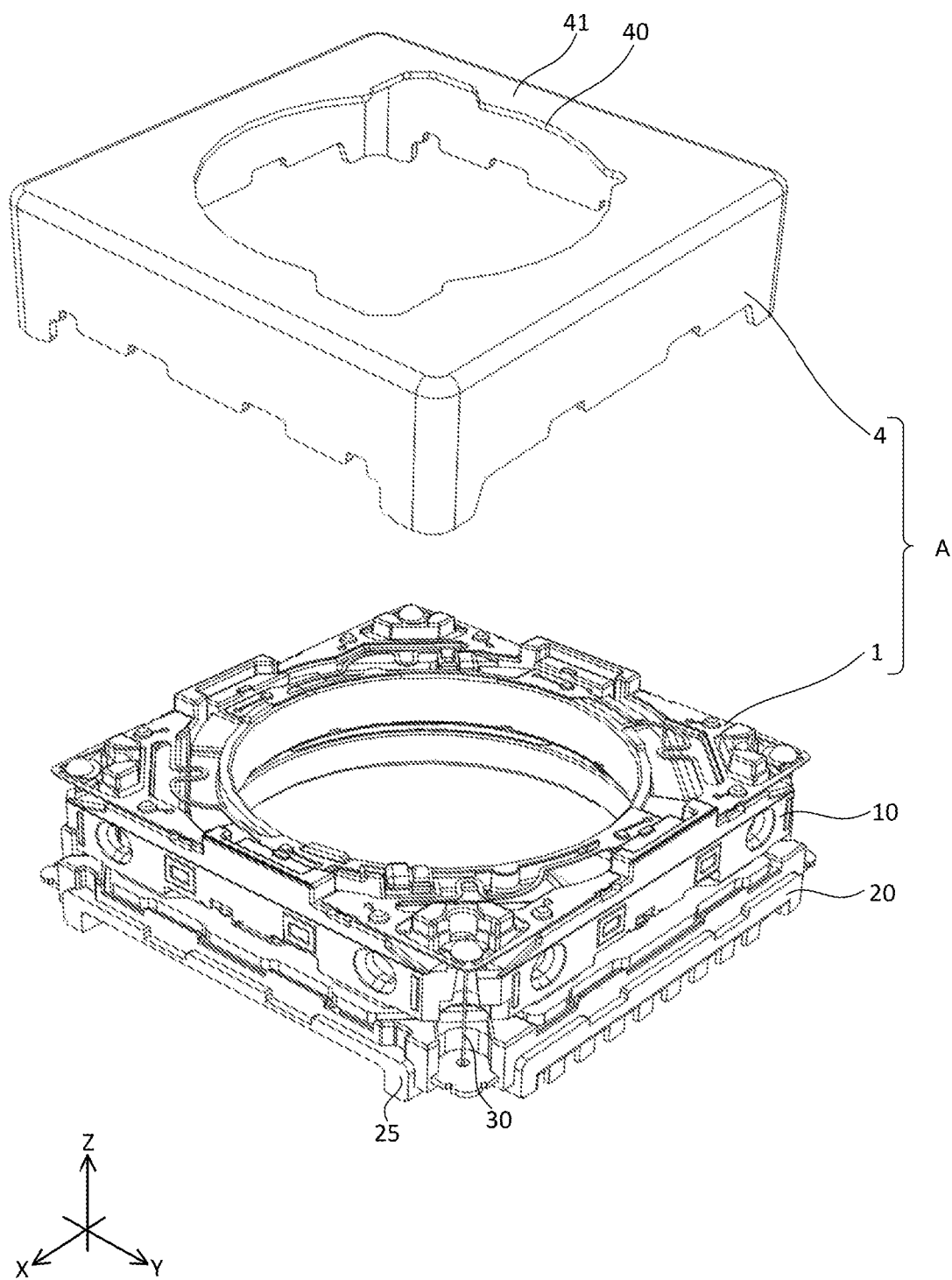
FIG. 3 is an exploded perspective view of the camera module.
Figure 4:
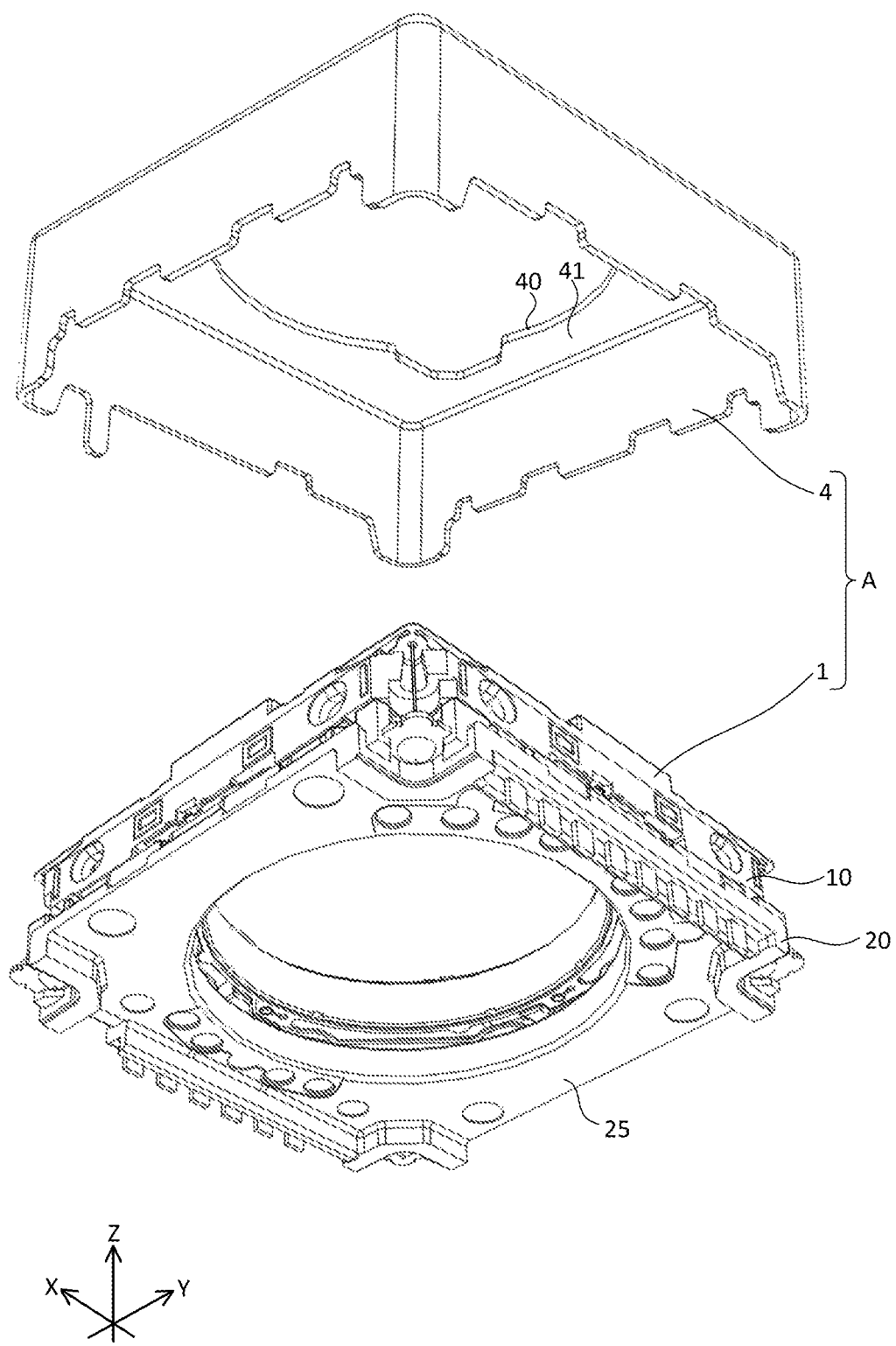
FIG. 4 is an exploded perspective view of the camera module.

FIG. 1A and FIG. 1B illustrate smartphone M in which camera module A according to the embodiment of the present invention is mounted. FIG. 1A is a front view of smartphone M, and FIG. 1B is a rear view of smartphone M. FIG. 2 is a perspective view of an external appearance of camera module A. FIG. 3 and FIG. 4 are exploded perspective views of camera module A. FIG. 3 is an upper perspective view, and FIG. 4 is a lower perspective view.

As illustrated in FIG. 2 to FIG. 4, the present embodiment will be described with an orthogonal coordinate system (X, Y, Z). Also in the drawings described later, descriptions will be made with an orthogonal coordinate system (X, Y, Z). In addition, the intermediate directions between the X and the Y directions, or in other words, the diagonal directions in plan view in the Z direction of camera module A are the U direction and the V direction (see FIG. 17).

Camera module A is mounted such that the vertical direction (or the horizontal direction) is the X direction, the horizontal direction (or the vertical direction) is the Y direction, and the front-rear direction is the Z direction at the time of actually capturing an image with smartphone M. That is, the Z direction is the light axis direction, the +side (e.g. the upper side in FIG. 2) in the Z direction is the light reception side in the light axis direction (also referred to as the macro position side), and the −side (e.g. the lower side in FIG. 2) in the Z direction is the imaging side in the light axis direction (also referred to as infinity position side). In addition, the X direction and the Y direction orthogonal to the Z axis may be referred to as "direction orthogonal to the optical axis," and the XY plane may be referred to as "plane orthogonal to the optical axis."

In addition, in the following description of the members of camera module A, "radial direction" and "circumferential direction" are directions in OIS movable part 10 described later (to be more specific, lens holder 110 and magnet holder 12a; see FIG. 7) unless otherwise noted.

In addition, for convenience of the following descriptions, in plan view of camera module A illustrated in FIG. 2 and the components of camera module A as viewed in the Z direction, the corner part on the +side in the X direction and on the +side in the Y direction is referred to as a first corner part, the corner part on the −side in the X direction and on the +side in the Y direction as a second corner part, the corner part on the −side in the X direction and on the −side in the Y direction as a third corner part, and the corner part on the +side in the X direction and on the −side in the Y direction as a fourth corner part.

For example, smartphone M illustrated in FIG. 1A and FIG. 1B is provided with camera module A as a back side camera OC. In camera module A, lens driving device 1 is employed. Lens driving device 1 has an auto-focusing function of automatically performing focusing for capturing a subject (hereinafter referred to as "AF (Auto Focus) function"), and a shake-correcting function (or "shake-correcting part," hereinafter referred to as "OIS (Optical Image Stabilization) function") of optically correcting hand-shake (vibration) upon capturing an image to reduce the irregularities of the image.

Auto-focusing and shake-correcting lens driving device 1 includes an auto-focusing driving part (hereinafter referred to as "AF driving part") for moving the lens part in the light axis direction, and a shake-correcting driving part (hereinafter referred to as "OIS driving part") for swaying the lens part in the plane orthogonal to the optical axis.

Camera Module

Camera module A includes a lens part (not illustrated) in which a lens is housed in a lens barrel (not illustrated) having a cylindrical shape, auto-focusing and shake-correcting lens driving device 1, an image capturing part (not illustrated) that captures a subject image imaged with the lens part, cover 4, and the like.

Cover

As viewed in plan view in the Z direction (light axis direction) cover 4 is a capped square cylindrical body having a square shape, and includes circular opening 40 in the top surface (the surface on the +side in the Z direction). A lens part (not illustrated) is exposed to the outside through opening 40. Cover 4 is fixed to lens driving device 1 (base member 25) with an adhesive agent (not illustrated) for example.

Image Pickup Part

The image pickup part (not illustrated) is disposed on the −side in the Z direction (the imaging side in the light axis direction) of lens driving device 1. The image pickup part includes an imaging device (not illustrated) such as a charge-coupled device (CCD) image sensor and a complementary metal oxide semiconductor (CMOS) image sensor and a sensor substrate on which to mount the imaging device. The imaging device picks up a subject image imaged by a lens part (not illustrated), for example. Lens driving device 1 is mounted on the sensor substrate (not illustrated), and electrically connected with the sensor substrate.

Lens Driving Device

Figure 5:
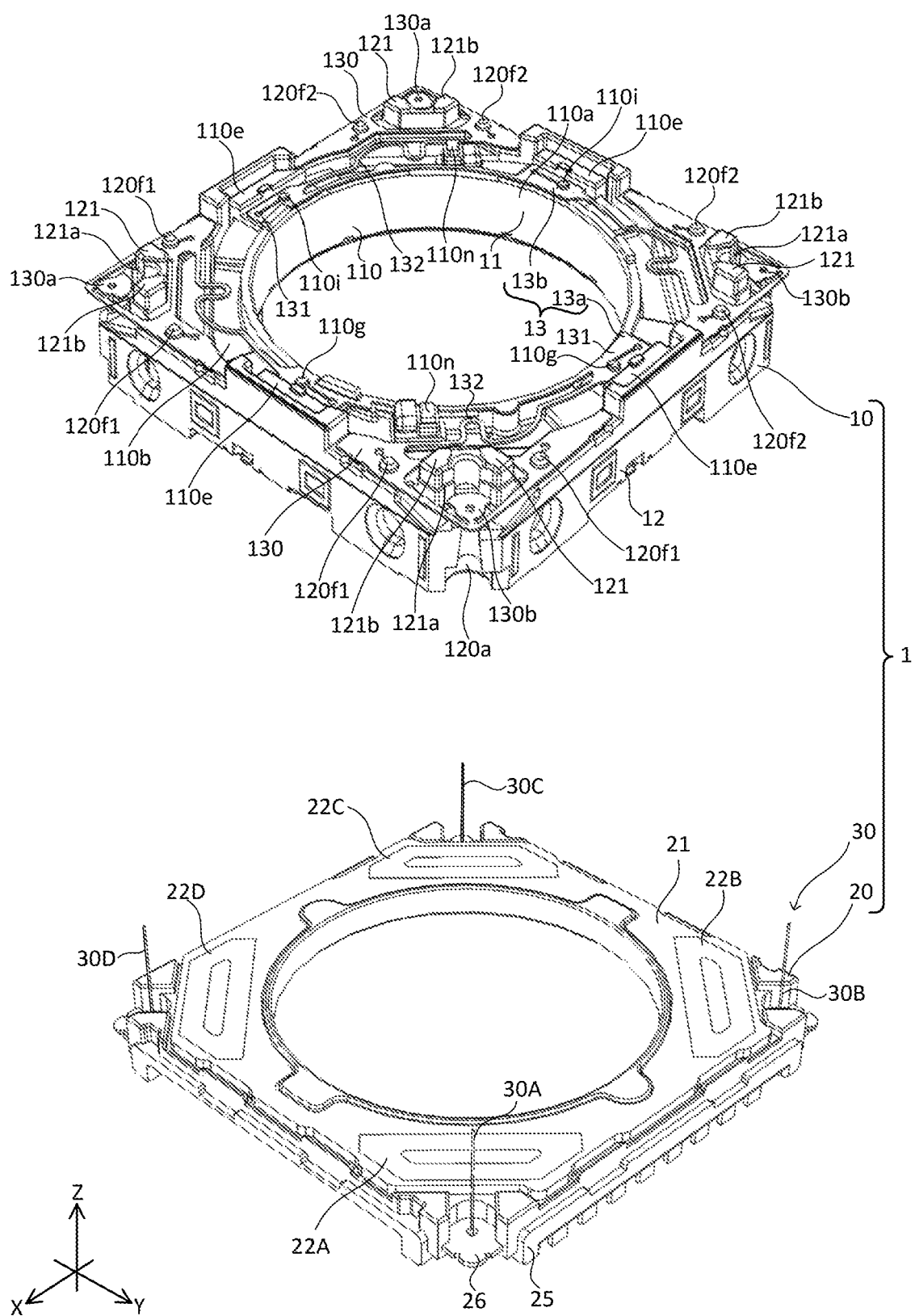
FIG. 5 is an exploded perspective view of a lens driving device.
Figure 6:
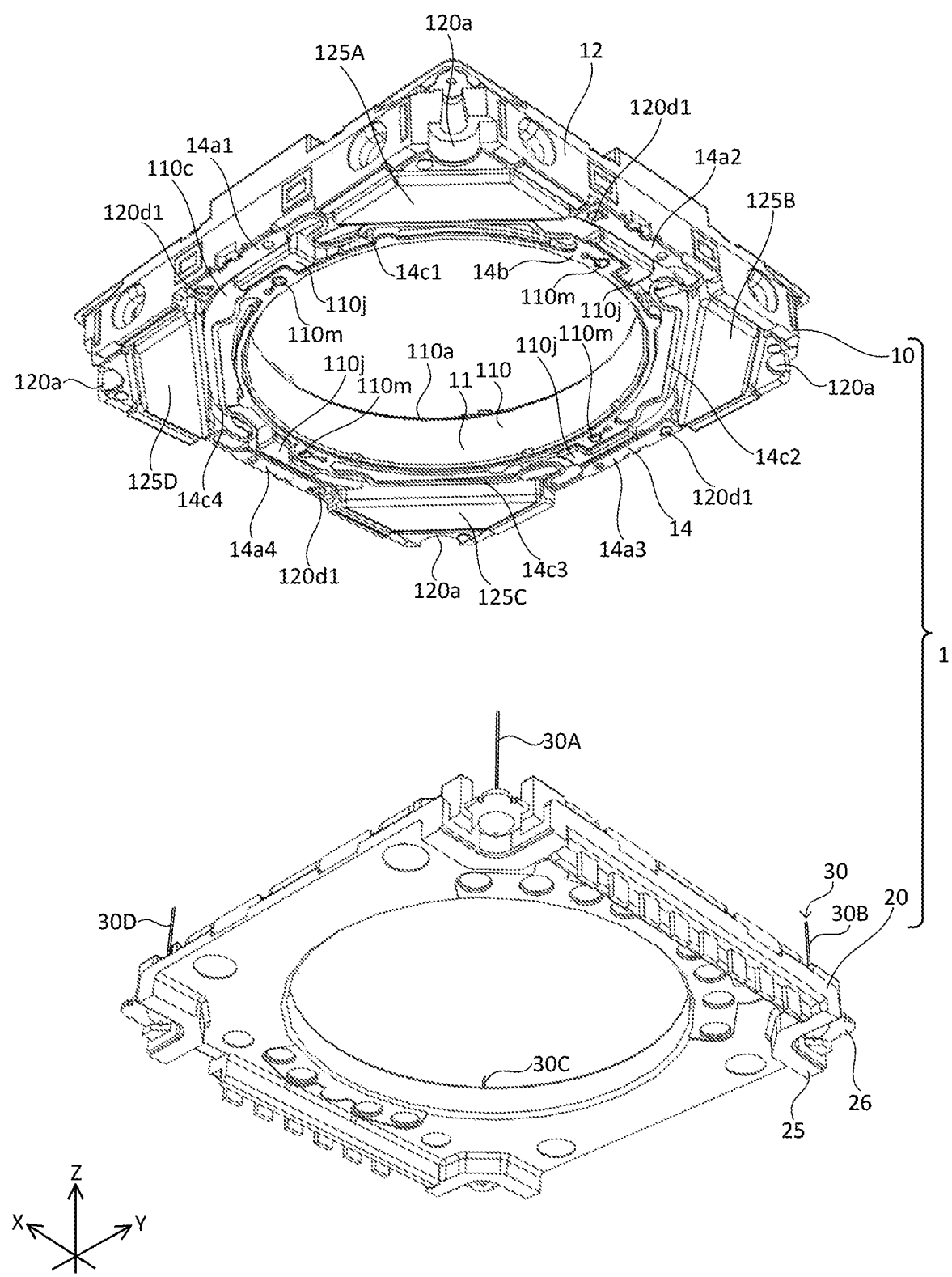
FIG. 6 is an exploded perspective view of the lens driving device as viewed at a different angle than FIG. 5.
Figure 7:
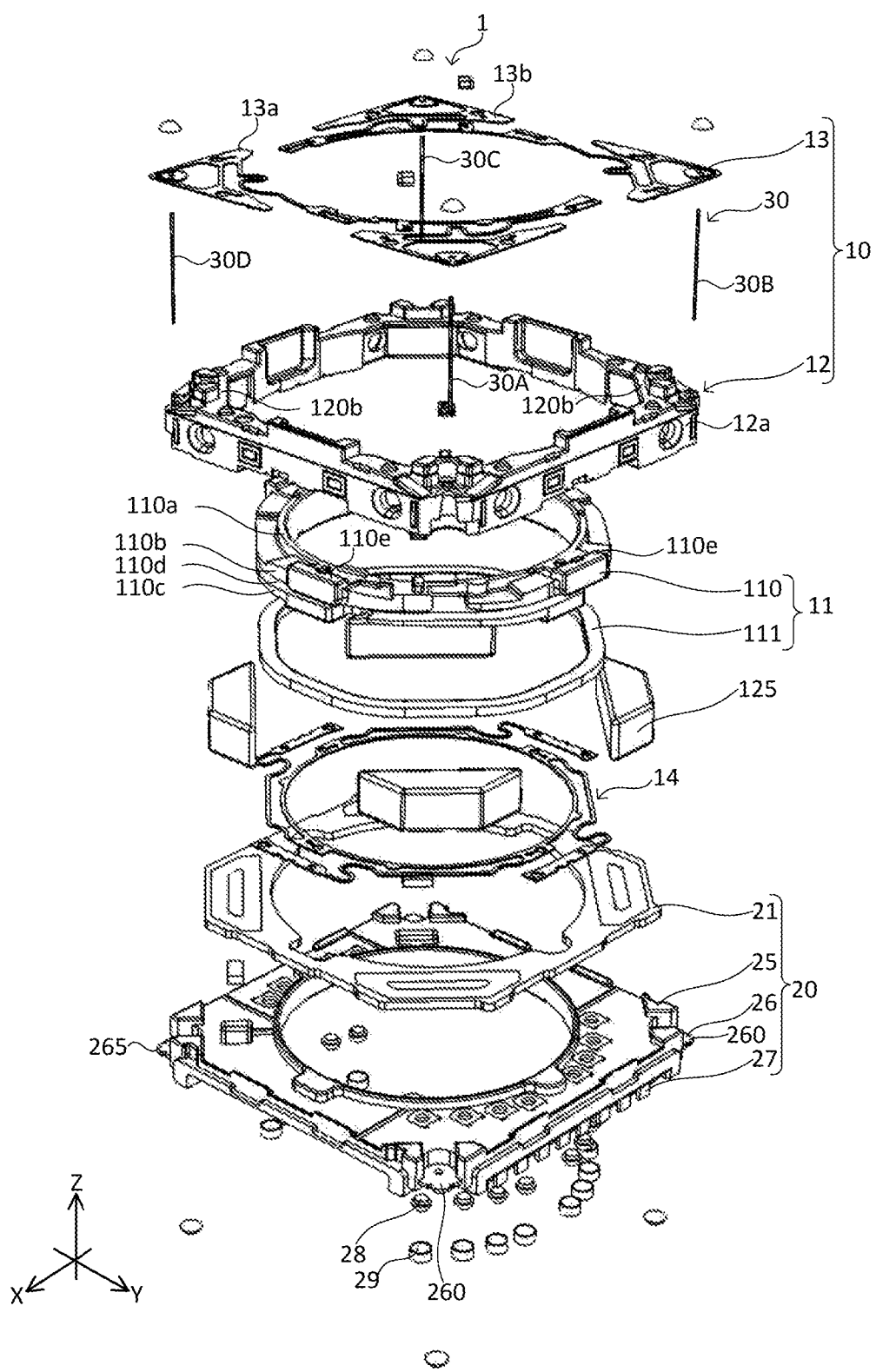
FIG. 7 is an exploded perspective view of the lens driving device.
Figure 8:
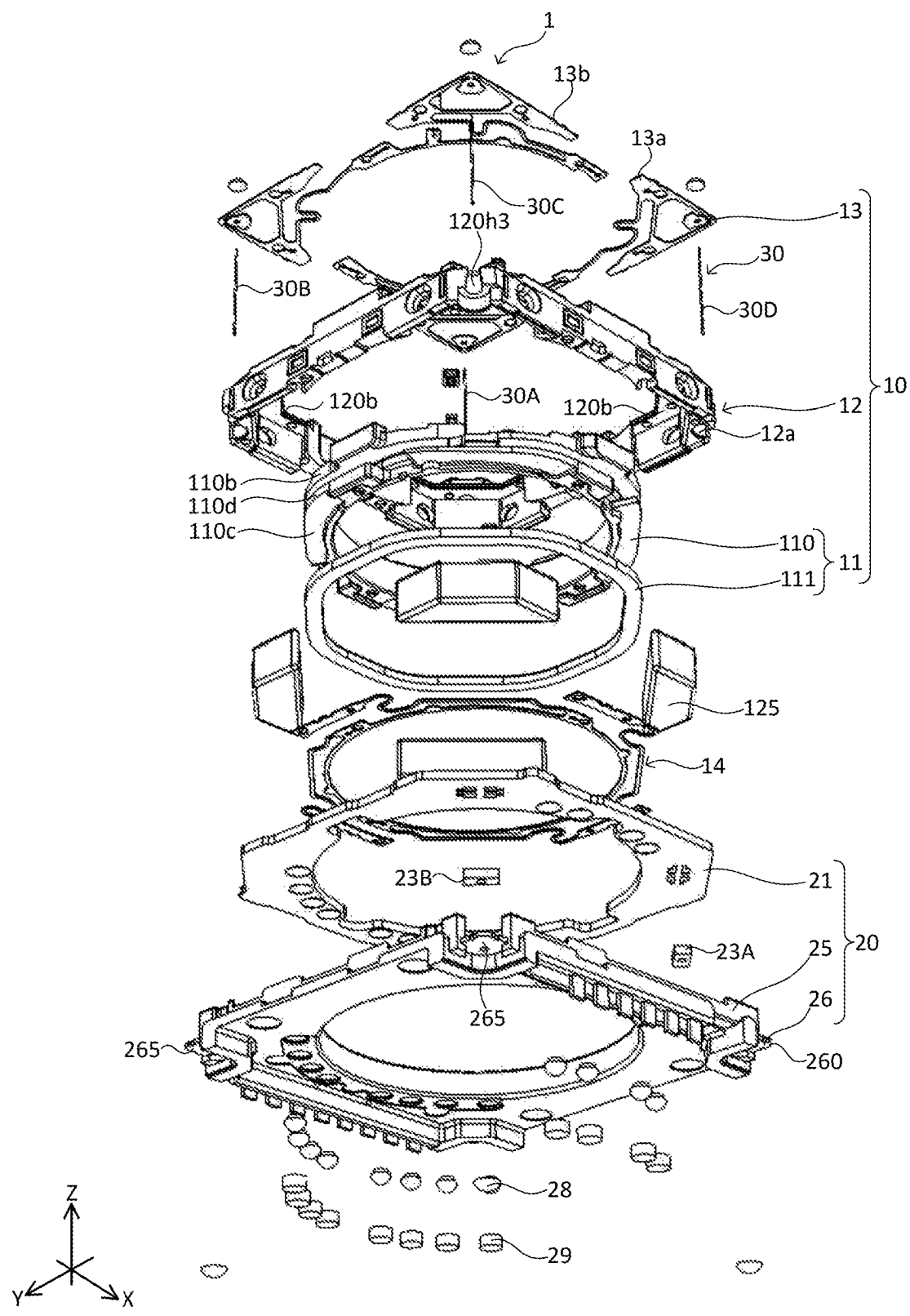
FIG. 8 is an exploded perspective view of the lens driving device as viewed at a different angle than FIG. 7.

FIG. 5 to FIG. 8 are exploded perspective views of lens driving device 1. FIG. 5 and FIG. 7 are upper perspective views, and FIG. 6 and FIG. 8 are lower perspective views. It is to be noted that FIG. 8 is an exploded perspective view of lens driving device 1 as viewed from a position shifted 180 degrees around the Z direction from the state of FIG. 6. As illustrated in FIG. 5 and FIG. 6, lens driving device 1 includes OIS movable part 10 (also referred to as movable part), OIS fixing part 20 (also referred to as fixing part), OIS supporting part 30 (suspension wire 30) and the like.

OIS Movable Part

OIS movable part 10 includes an OIS magnet part serving as a component of the OIS voice coil motor, and sways in a plane orthogonal to the optical axis at the time of shake correction. OIS fixing part 20 includes an OIS coil part. That is, the OIS driving part of lens driving device 1 is of a moving magnet type. OIS movable part 10 is also an "AF unit" including the AF driving part.

OIS movable part 10 is disposed above OIS fixing part 20 on the +side (on the light reception side or the upper side in the light axis direction) in the Z direction so as to be separated from OIS fixing part 20. OIS movable part 10 is coupled with OIS fixing part 20 through OIS supporting part 30.

To be more specific, OIS supporting part 30 is composed of four suspension wires extending along the Z direction (hereinafter referred to as suspension wires 30). One ends (lower ends) of suspension wires 30 are fixed to OIS fixing part 20 (to be more specific, first wire connecting part 260 and second wire connecting part 265 of lead 26; see FIG. 20B), and the other ends (upper ends) thereof are fixed to OIS movable part 10 (to be more specific, upper elastic supporting part 13; see FIG. 9). OIS movable part 10 is supported by suspension wire 30 such that OIS movable part 10 can sway in the plane orthogonal to the optical axis.

In the present embodiment, suspension wire 30A, of four suspension wires 30, disposed at the first corner part and suspension wire 30B, of four suspension wires 30, disposed at the second corner part are used as power feeding paths to an AF control part (not illustrated).

On the other hand, suspension wire 30C disposed at the third corner part and suspension wire 30D disposed at the fourth corner part are used as signal paths for transmitting a control signal to the AF control part (not illustrated). It is to be noted that the number of suspension wires 30 is not limited to this, and may be greater than four, for example.

Now OIS movable part 10 is described with reference to FIG. 5 to FIG. 17. As illustrated in FIG. 5 and FIG. 6, OIS movable part 10 (also referred to as AF unit) includes AF movable part 11, AF fixing part 12, upper elastic supporting part 13 (see FIG. 9A), lower elastic supporting part 14 (see FIG. 9B) and the like.

AF Movable Part

AF movable part 11 is separated from AF fixing part 12 inside AF fixing part 12 in the radial direction. AF movable part 11 is coupled with AF fixing part 12 by upper elastic supporting part 13 and lower elastic supporting part 14.

AF movable part 11 includes a coil part of an AF voice coil motor, and moves with respect to AF fixing part 12 in the Z direction (light axis direction) at the time of focusing. AF fixing part 12 includes a magnet part of the AF voice coil motor. That is, the AF driving part of lens driving device 1 is of a moving coil type.

AF movable part 11 includes lens holder 110 and AF coil part 111 (see FIG. 7 and FIG. 8).

Lens Holder

Lens holder 110 includes cylindrical lens housing part 110a (see FIG. 5 and FIG. 6). Preferably, the inner periphery surface of lens housing part 110a is provided with a groove (not illustrated) to which adhesive agent is applied. A method of screwing a lens part (not illustrated) to lens housing part 110a might damage suspension wire 30 that supports OIS movable part 10.

In contrast, in the present embodiment, damaging of suspension wire 30 at the time when the lens part is attached can be prevented since a lens part (not illustrated) is fixed to the inner periphery surface of lens housing part 110a by bonding. In addition, the inner periphery surface of lens housing part 110a is provided with a groove, and the groove holds an appropriate amount of adhesive agent, thereby achieving a high bonding power between lens holder 110 and the lens part.

Lens holder 110 includes upper flange 110b (see FIG. 5 to FIG. 7) and lower flange 110c (see FIG. 6 and FIG. 7) protruding from the outer peripheral surface of lens housing part 110a to the outside in the radial direction. Lens holder 110 includes, in the outer peripheral surface, coil winding part 110d having a groove form that is continuous over the entire circumference between upper flange 110b and lower flange 110c (see FIG. 7).

That is, lens holder 110 has a bobbin structure. Each of upper flange 110b and lower flange 110c has a substantially octagonal shape in plan view.

Lens holder 110 includes upper protruding part 110e protruding to the outside in the radial direction and to the +side in the Z direction at parts (four places separated from each other in the circumferential direction) of upper flange 110b (see FIG. 5 to FIG. 7). The front surface (the surface on the +side in the Z direction) of upper protruding part 110e serves as a locking part that limits the movement of AF movable part 11 to the +side in the Z direction (the light reception side in the light axis direction).

Figure 9A:
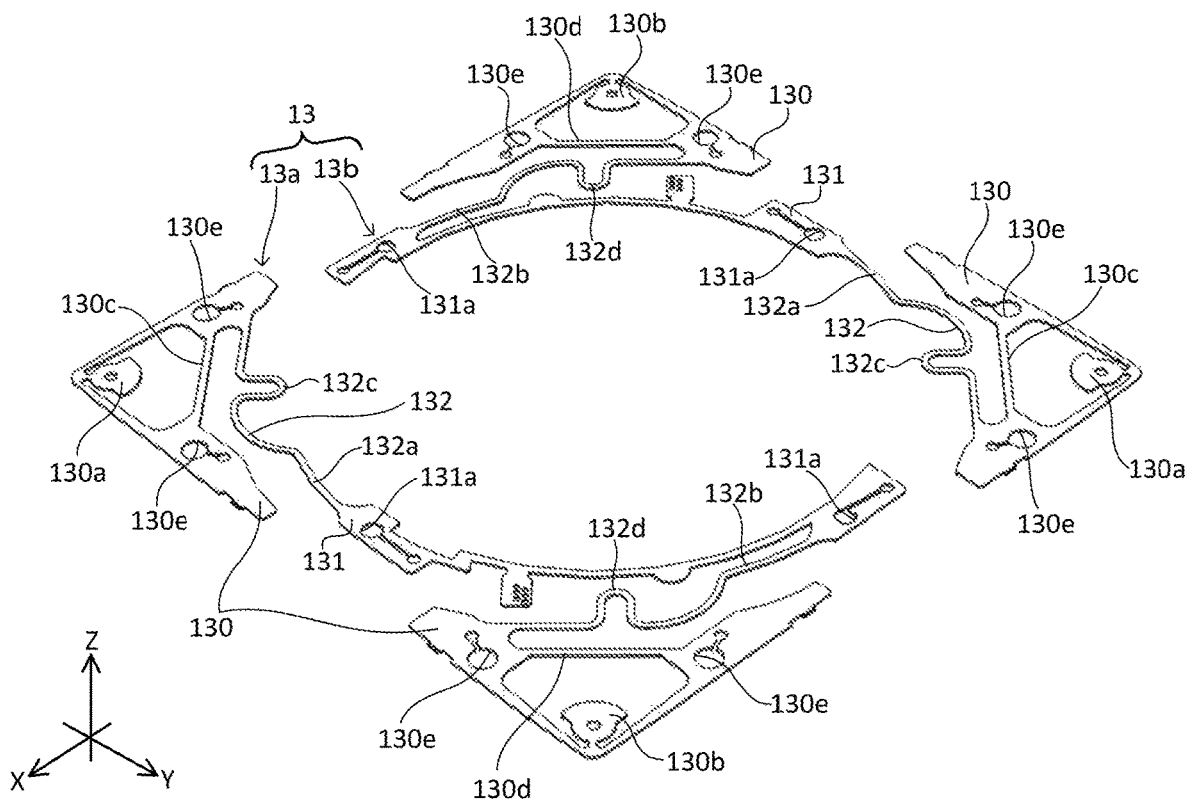
FIG. 9A is a perspective view of an upper elastic supporting part.
Figure 10A:
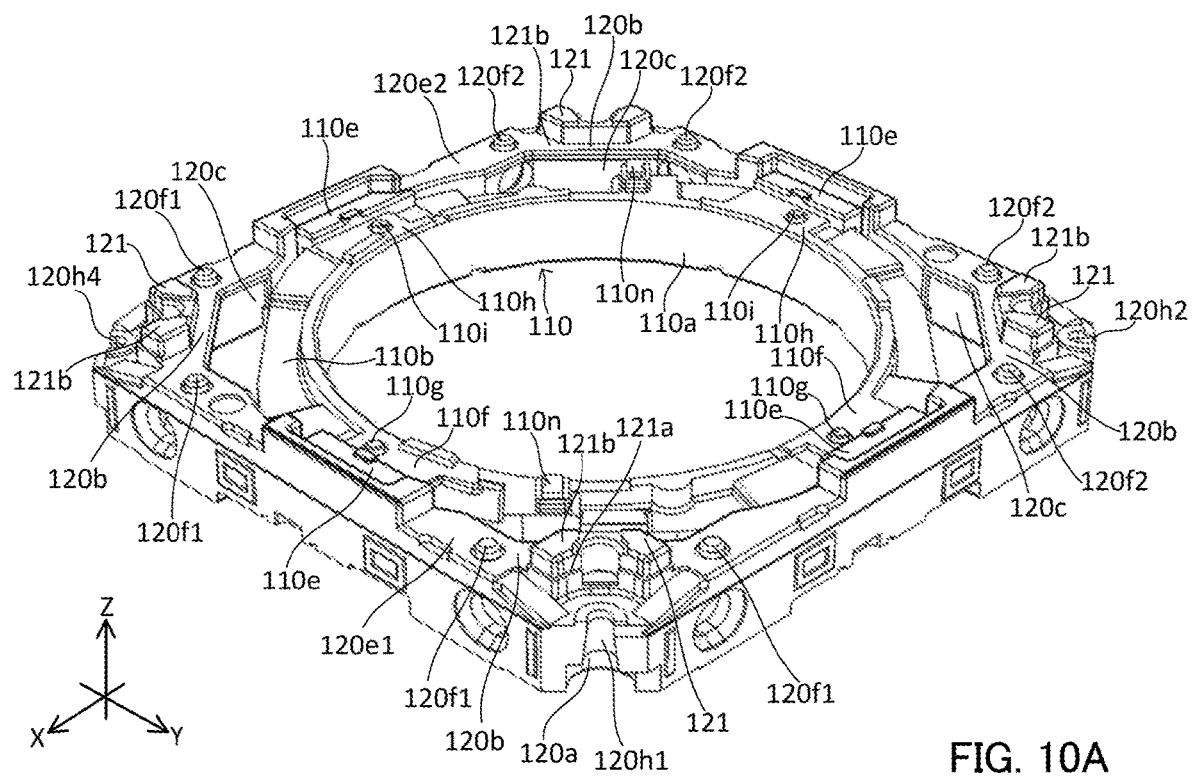
FIG. 10A and FIG. 10B are perspective views illustrating configurations of a lens holder and a magnet holder.

Lens holder 110 includes a pair of upper spring fixing parts 110f at an end portion on the +side in the X direction and an end portion on the +side in the Y direction in the surface (front surface) on the +side in the Z direction (see FIG. 10A). Each upper spring fixing part 110f includes upper boss 110g (see FIG. 5 and FIG. 10A) for positioning and fixing inner fixing part 131 of upper spring element 13a described later (see FIG. 5 and FIG. 9A).

On the other hand, lens holder 110 includes a pair of upper spring fixing parts 110h (see FIG. 10A) at an end portion on the −side in the X direction and an end portion on the −side in the Y direction in the front surface. Each upper spring fixing part 110h includes upper boss 110i (see FIG. 5 and FIG. 10A) for positioning and fixing inner fixing part 131 of upper spring element 13b described later (see FIG. 5 and FIG. 9A).

Lens holder 110 includes, in the front surface thereof, a pair of tying parts 110n at a portion (the end portion on the +side in the U direction) between the pair of upper spring fixing parts 110f in the circumferential direction, and at a portion (the end portion on the −side in the U direction) between the pair of upper spring fixing parts 110h in the circumferential direction (see FIG. 5 and FIG. 10A). In the assembled state, the pair of tying parts 110n are disposed in a gap between the front surface of lens holder 110 and the inner surface of top plate part 41 of cover 4 in the Z direction (see FIG. 2 to FIG. 4). With the configuration in which the pair of tying parts 110n are disposed in the gap, space-saving of lens holder 110 in the radial direction can be achieved.

Lens holder 110 includes lower protruding part 110j (see FIG. 6 and FIG. 10B) protruding to the outside in the radial direction and to the −side in the Z direction at parts (four places separated from each other in the circumferential direction) of lower flange 110c. The front surface (lower end surface) of lower protruding part 110j that is the end surface of lower protruding part 110j on the +side in the Z direction is opposite to the front surface (the surface on the +side in the Z direction) of coil substrate 21 of OIS fixing part 20 in the Z direction. The surface (rear surface) of lower protruding part 110j on the −side in the Z direction serves as a locking part for limiting the movement of AF movable part 11 to the −side in the Z direction.

Figure 10B:
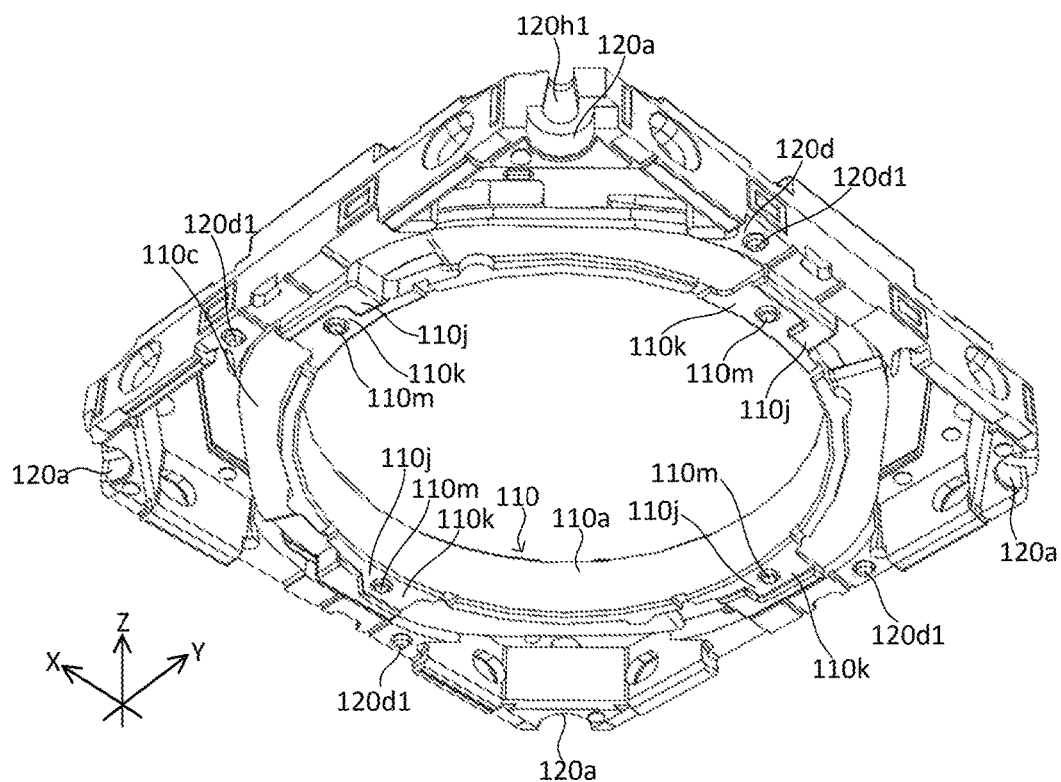

Lens holder 110 includes lower spring fixing parts 110k at positions (in the present embodiment, four positions) in the rear surface (see FIG. 10B). Each lower spring fixing part 110k includes lower boss 110m for positioning and fixing inner fixing part 14b of lower elastic supporting part 14 (see FIG. 6 and FIG. 10B).

In the present embodiment, lens holder 110 is formed with polyarylate (PAR) or a PAR alloy composed of different types of resins including PAR (e.g. PAR/PC). With this configuration, a welding power higher than that of a conventional shaping material such as liquid crystal polymer (LCP) is achieved, and accordingly toughness and impact resistance can be ensured even when lens holder 110 is thinned. Accordingly, a small external size of lens driving device 1 can be achieved, and downsizing and weight reduction can be achieved.

AF Coil Part

AF coil part 111 (see FIG. 7 and FIG. 8) is an air-core coil that is energized at the time of focusing, and is wound around the outer peripheral surface of coil winding part 110d of lens holder 110. One end of AF coil part 111 is tied to one tying part 110n of lens holder 110 and the other end of AF coil part 111 is tied to the other tying part 110n.

AF Fixing Part

AF fixing part 12 includes magnet holder 12a and magnet part 125 (see FIG. 7).

Magnet Holder

Magnet holder 12a has a square cylindrical shape which is square in plan view in the Z direction. Magnet holder 12a includes arc grooves 120a recessed inward in the radial direction at four corners of the outer peripheral surface (see FIG. 6). Suspension wires 30A to 30D are disposed at arc grooves 120a.

Magnet holder 12a includes four magnet cover parts 120b protruding inward in the radial direction at the end portion (upper end) on the +side in the Z direction of the four corners (see FIG. 10A). Magnet holder 12a includes magnet installation parts 120c at the four corners in the inner peripheral surface (see FIG. 10A).

Magnet holder 12a includes lower spring fixing part 120d for fixing lower elastic supporting part 14 at the end surface on the −side in the Z direction (rear surface) (see FIG. 10B). Lower spring fixing part 120d includes a plurality of (in the present embodiment, four) lower bosses 120d1 (see FIG. 6 and FIG. 10B) for positioning and fixing outer fixing parts 14a1 to 14a4 of lower elastic supporting part 14.

Magnet holder 12a includes upper spring fixing part 120e1 (see FIG. 10A) for fixing upper spring element 13a of upper elastic supporting part 13 in a half portion (i.e. the half portion on the +side in the X direction) including the first corner part and the fourth corner part in the surface on the +side in the Z direction (front surface). Upper spring fixing part 120e1 includes four upper bosses 120f1 for positioning and fixing upper spring element 13a of upper elastic supporting part 13 (see FIG. 5 and FIG. 10A).

On the other hand, magnet holder 12a includes upper spring fixing part 120e2 for fixing upper spring element 13b of upper elastic supporting part 13 in a half portion (i.e. the half portion on the −side in the X direction) including the second corner part and the third corner part in the front surface (see FIG. 10A). Upper spring fixing part 120e2 includes four upper bosses 120f2 for positioning and fixing upper spring element 13b of upper elastic supporting part 13 (see FIG. 5 and FIG. 10A).

Upper spring fixing part 120e1 includes wire insertion parts 120h1 and 120h4 for insertion of suspension wires 30A and 30B at the corner parts (i.e. the first corner part and the fourth corner part) (see FIG. 10A).

On the other hand, upper spring fixing part 120e2 includes wire insertion parts 120h2 and 120h3 for insertion of suspension wires 30C and 30D at the corner parts (i.e. the second corner part and the third corner part) (see FIG. 8 and FIG. 10A).

With wire insertion parts 120h1 to 120h4, interference between suspension wire 30 and magnet holder 12a at the time when OIS movable part 10 sways can be avoided.

Magnet holder 12a includes, at the surface of each magnet cover part 120b on the +side in the Z direction (front surface), stopper protrusion 121 protruding from the front surface to the +side in the Z direction (see FIG. 5 and FIG. 10A). In other words, in magnet holder 12a, stopper protrusions 121 are disposed in regions close to wire insertion parts 120h1 to 120h4 inside wire insertion parts 120h1 to 120h4 in the radial direction.

Damper

Figure 11:
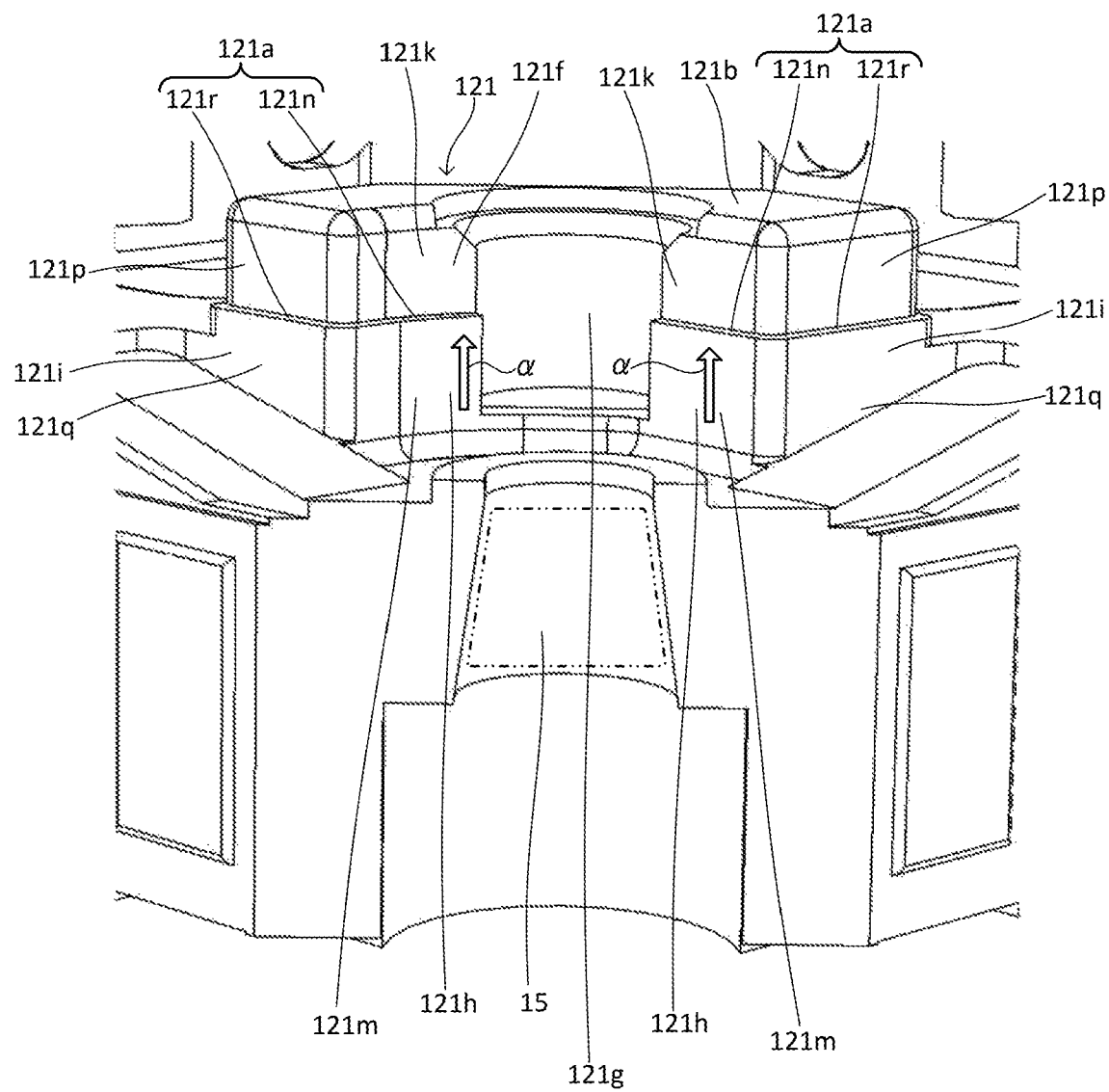
FIG. 11 illustrates a first corner part of the magnet holder as viewed from the outside in the radial direction.

In addition, damper 15 is disposed so as to surround suspension wires 30A to 30D at wire insertion parts 120h1 to 120h4 of magnet holder 12a (see FIG. 11). With damper 15 interposed between magnet holder 12a and suspension wires 30A to 30D, generation of unnecessary resonance (high-order resonance mode) is reduced, and accordingly the stability of the operation can be ensured.

Damper 15 can be readily applied to wire insertion parts 120h1 to 120h4 with a dispenser. For example, ultraviolet curing silicone gel may be adopted as damper 15.

Stopper Protrusion

Front end surface 121b of stopper protrusion 121 (that is, the surface on the +side in the Z direction) is located over other portions of OIS movable part 10 on the +side in the Z direction. In the assembled state, front end surface 121b is opposite to a surface (rear surface) of top plate part 41 of cover 4 on the −side in the Z direction with a predetermined gap therebetween in the Z direction.

Accordingly, when an impact is exerted on OIS movable part 10, and OIS movable part 10 is displaced to the +side in the Z direction, top plate part 41 of cover 4 makes contact with front end surface 121*b* before other portions make contact with front end surface 121*b*. In this manner, stopper protrusion 121 limits displacement of OIS movable part 10 to the +side in the Z direction to a predetermined amount.

Stopper protrusion 121 includes, in the side surface, flow stopper part 121*a* (such as stopper step 121*n* and side stopper step 121*r* described later; see FIGS. 5, 11, and 12). In the side surface of stopper protrusion 121, flow stopper part 121*a* is provided in at least a part of a surface that serves as a path of damper 15 moving to the +side in the Z direction.

Flow stopper part 121*a* serves as a resistance against displacement of damper 15 to the +side in the Z direction along the side surface of stopper protrusion 121. That is, flow stopper part 121*a* acts to prevent damper 15 from moving to the +side in the Z direction and from making contact with front end surface 121*b* of stopper protrusion 121.

The reason for the prevention of the contact is that, when damper 15 makes contact with front end surface 121*b* of stopper protrusion 121 and the rear surface of top plate part 41 of cover 4, damper 15 might become a resistance against displacement of OIS movable part 10 in shake correction, and might reduce the accuracy of shake correction.

Figure 12:
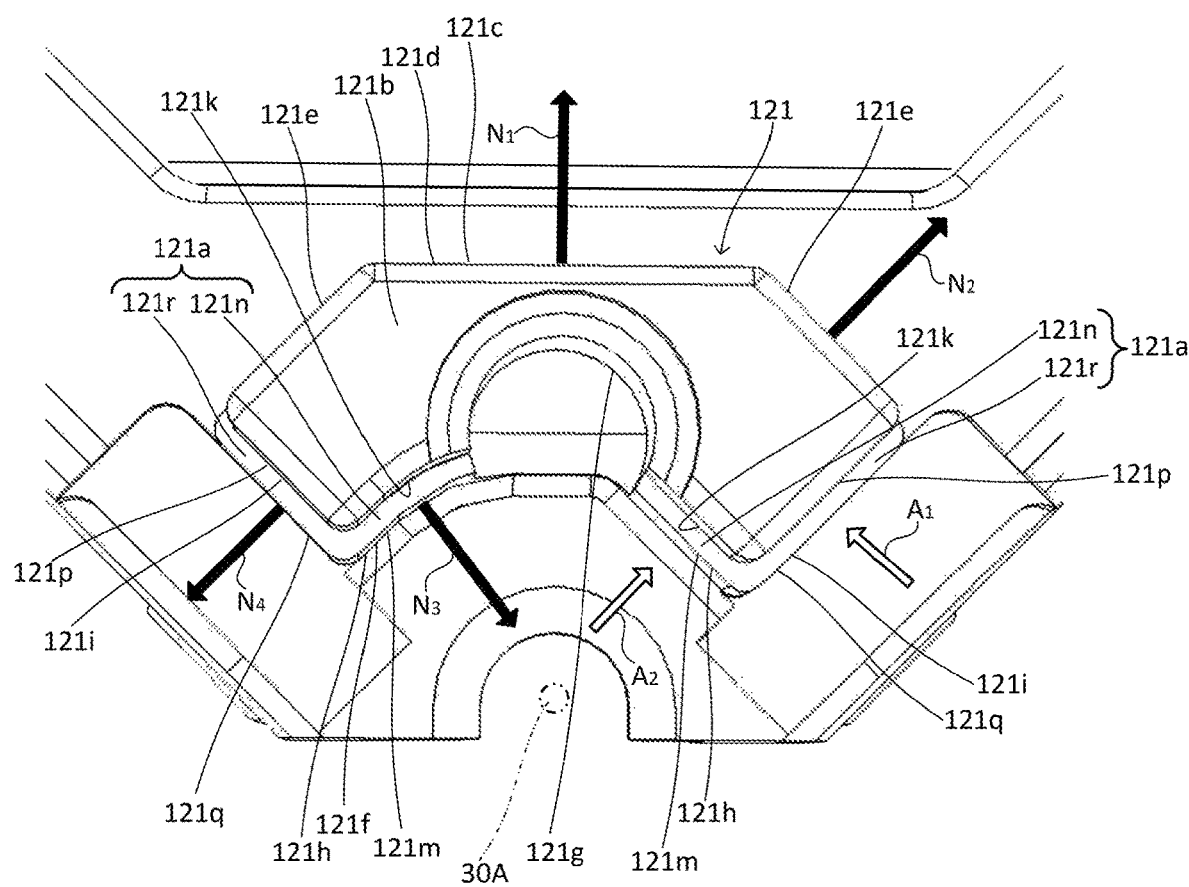
FIG. 12 illustrates the first corner part of the magnet holder as viewed from the light reception side in the light axis direction.

Now the configuration of stopper protrusion 121 is elaborated with reference to FIG. 11 and FIG. 12. FIG. 11 illustrates the first corner part of magnet holder 12*a* as viewed from the outside in the radial direction. FIG. 12 illustrates the first corner part of magnet holder 12*a* as viewed from the +side in the Z direction (the light reception side in the light axis direction).

Below, a structure of stopper protrusion 121 provided at the first corner part is described as an example. It is to be noted that the structure of each of stopper protrusions 121 provided at second corner part to the fourth corner part is similar to the structure of stopper protrusion 121 provided at the first corner part.

The structure of stopper protrusions 121 provided at the second to fourth corner parts may be appropriately understood from the following description of stopper protrusion 121 provided at the first corner part.

Stopper protrusion 121 provided at the first corner part includes front end surface 121*b*, inner surface 121*c*, and outer surface 121*f*. Front end surface 121*b* faces the +side in the Z direction.

Inner surface 121*c* is composed of a surface facing inside in the radial direction. It is to be noted that the surface facing inside in the radial direction is a surface whose normal vector (e.g. $N_1$ and $N_2$ in FIG. 12) has a vector component toward inside in the radial direction (upper side in FIG. 12). To be more specific, inner surface 121*c* includes center inner surface 121*d* and a pair of side inner surfaces 121*e*. It is to be noted that inner surface 121*c* is provided with no step such as stopper step 121*n* and side stopper step 121*r* described later.

Outer surface 121*f* is composed of a surface facing the outside in the radial direction. It is to be noted that the surface facing the outside in the radial direction is a surface whose normal vector (e.g. $N_3$ and $N_4$ in FIG. 12) has a vector component toward the outside in the radial direction (the lower side in FIG. 12).

To be more specific, in plan view from suspension wire 30A side, outer surface 121*f* includes outer recessed surface 121*g* at a center portion in the width direction (in FIG. 11 and FIG. 12, the horizontal direction). Outer surface 121*f* includes a pair of wire-opposing surfaces 121*h* on both sides of outer recessed surface 121*g* in the width direction. In addition, outer surface 121*f* includes a pair of side outer surfaces 121*i* outside the pair of wire-opposing surfaces 121*h* in the width direction.

Each wire-opposing surface 121*h* is opposed to suspension wire 30A in the radial direction of suspension wire 30A. Each wire-opposing surface 121*h* includes first opposing surface 121*k* on the +side in the Z direction and second opposing surface 121*m* on the −side in the Z direction.

Second opposing surface 121*m* is located outside relative to first opposing surface 121*k* in the radial direction. In other words, in the radial direction, second opposing surface 121*m* is closer to suspension wire 30A relative to first opposing surface 121*k*.

Each wire-opposing surface 121*h* includes stopper step 121*n* that connects between the end portion of first opposing surface 121*k* on the −side in the Z direction and the end portion of second opposing surface 121*m* on the +side in the Z direction. Stopper step 121*n* serves as flow stopper part 121*a*. It is to be noted that stopper step 121*n* may be disposed in multiple positions separated in the Z direction in the pair of wire-opposing surfaces 121*h*.

Each outer surface 121*i* includes first side surface 121*p* on the +side in the Z direction and second side surface 121*q* on the −side in the Z direction.

Second side surface 121*q* is located outside first side surface 121*p* in the radial direction. Each side outer surface 121*i* includes side stopper step 121*r* that connects between the end portion of first side surface 121*p* on the −side in the Z direction and the end portion of second side surface 121*q* on the +side in the Z direction.

Together with stopper step 121*n*, side stopper step 121*r* serves as flow stopper part 121*a*. It is to be noted that side stopper step 121*r* may be provided in plural positions separated from each other in the Z direction in the pair of side outer surfaces 121*i*. Side stopper step 121*r* of the pair of side outer surfaces 121*i* may be omitted.

Next, with reference to FIG. 13A to FIG. 16B, modifications of flow stopper part 121*a* is described.

FIG. 13A and FIG. 13B describe a first modification of flow stopper part 121*a*. FIG. 13A is a schematic view of a part of the stopper protrusion as viewed in the direction of arrow $A_1$ of FIG. 12, and FIG. 13B is a schematic view of a part of the stopper protrusion as viewed in the direction of arrow $A_2$ of FIG. 12.

In stopper protrusion 121A illustrated in FIG. 13A and FIG. 13B, wire-opposing surface 121*h*1 includes first opposing surface 121*k*1 on the +side in the Z direction (the upper side in FIG. 13A and FIG. 13B) and second opposing surface 121*m*1 on the −side in the Z direction (the lower side in FIG. 13A and FIG. 13B). Second opposing surface 121*m*1 is located inside first opposing surface 121*k*1 in the radial direction (the right side in FIG. 13A).

Each wire-opposing surface 121*h*1 includes stopper step 121*n*1 that connects between the end portion of first opposing surface 121*k*1 on the −side in the Z direction and the end portion of second opposing surface 121*m*1 on the +side in the Z direction.

Side outer surface 121*i*1 includes first side surface 121*p*1 on the +side in the Z direction and second side surface 121*q*1 on the −side in the Z direction. Second side surface 121*q*1 is located inside first side surface 121*p*1 in the radial direction (the left side in FIG. 13B).

Each side outer surface 121*i*1 includes side stopper step 121*r*1 that connects between the end portion of first side surface 121*p*1 on the −side in the Z direction and the end portion of second side surface 121*q*1 on the +side in the Z direction. In the present modification, stopper step 121*n*1 and side stopper step 121*r*1 serve as flow stopper part 121*a*.

FIG. 14A and FIG. 14B describe modification 2 of flow stopper part 121*a*. FIG. 14A is a schematic view of a part of the stopper protrusion as viewed in the direction of arrow $A_1$ of FIG. 12, and FIG. 14B is a schematic view of a part of the stopper protrusion as viewed in the direction of arrow $A_2$ of FIG. 12.

In stopper protrusion 121B illustrated in FIG. 14A and FIG. 14B, wire-opposing surface 121*h*2 includes, at a center part in the Z direction (in FIG. 14A and FIG. 14B, the vertical direction), flow stopper protrusion 121*s*1 extending in the width direction of wire-opposing surface 121*h*2 (in FIG. 14B, the horizontal direction).

Side outer surface 121*i*2 includes, at a center part in the Z direction, side flow stopper protrusion 121*s*2 extending in the width direction of side outer surface 121*i*2 (in FIG. 14A, the horizontal direction). In the present modification, flow stopper protrusion 121*s*1 and side flow stopper protrusion 121*s*2 serve as flow stopper part 121*a*. It is to be noted that the positions, sizes, numbers and the like of flow stopper protrusion 121*s*1 and side flow stopper protrusion 121*s*2 are not limited to those of the present modification.

Figure 15A:
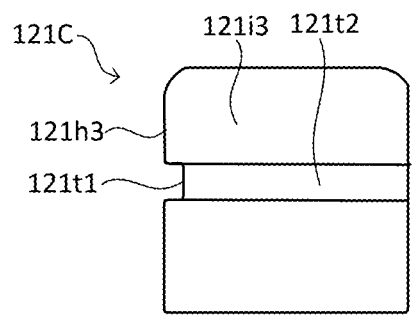
FIG. 15A and FIG. 15B illustrate modification 3 of the flow stopper part.
Figure 15B:
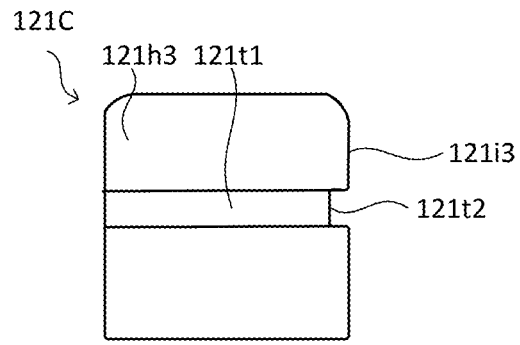

FIG. 15A and FIG. 15B describe modification 3 of flow stopper part 121*a*. FIG. 15A is a schematic view of a part of the stopper protrusion as viewed in the direction of arrow $A_1$ of FIG. 12, and FIG. 15B is a schematic view of a part of the stopper protrusion as viewed in the direction of arrow $A_2$ of FIG. 12.

In stopper protrusion 121C illustrated in FIG. 15A and FIG. 15B, wire-opposing surface 121*h*3 includes, at a center part in the Z direction, flow stopper groove 121*t*1 extending in the width direction of wire-opposing surface 121*h*3 (in FIG. 15B, the horizontal direction).

Side outer surface 121*i*3 includes, at a center part in the Z direction, side flow stopper groove 121*t*2 extending in the width direction of side outer surface 121*i*3 (in FIG. 15A, the horizontal direction). In the present modification, flow stopper groove 121*t*1 and side flow stopper groove 121*t*2 serve as flow stopper part 121*a*. It is to be noted that the positions, sizes, numbers and the like of flow stopper groove 121*t*1 and side flow stopper groove 121*t*2 are not limited to those of the present modification.

Figure 16A:
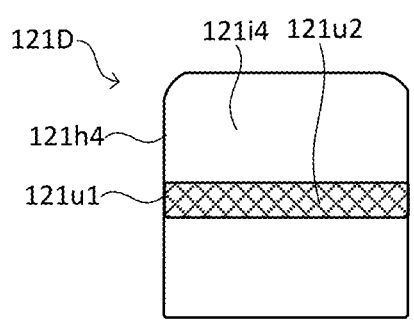
FIG. 16A is a schematic view of a part of the stopper protrusion as viewed in the arrow $A_1$ direction of FIG. 12.
Figure 16B:
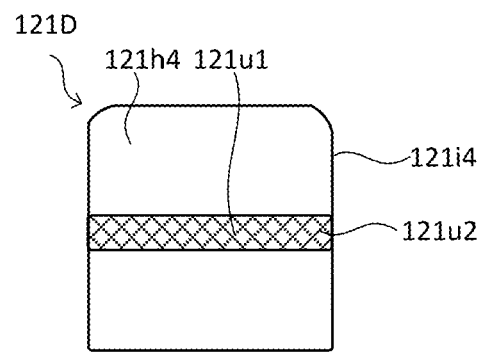
FIG. 16B is a schematic view of a part of the stopper protrusion as viewed in the arrow $A_2$ direction of FIG. 12.

FIG. 16A and FIG. 16B describe a first modification of flow stopper part 121*a*. FIG. 16A is a schematic view of a part of the stopper protrusion as viewed in the direction of arrow $A_1$ of FIG. 12, and FIG. 16B is a schematic view of a part of the stopper protrusion as viewed in the direction of arrow $A_2$ of FIG. 12.

In stopper protrusion 121D illustrated in FIG. 16A and FIG. 16B, wire-opposing surface 121*h*4 includes, at a center part (in FIG. 16B, the oblique grid pattern) in the Z direction (in FIG. 16B, the vertical direction), grain formation part 121*u*1 having a pattern of projections and depressions such as wrinkles is formed over the entire length in the width direction of wire-opposing surface 121*h*4 (in FIG. 16B, the horizontal direction).

Side outer surface 121*i*4 includes, at a center part in the Z direction (FIG. 16A the oblique grid pattern), side grain formation part 121*u*2 having a pattern of projections and depressions such as wrinkles is formed over the entire length in the width direction of side outer surface 121*i*4 (in FIG. 16A, the horizontal direction).

In the present modification, grain formation part 121*u*1 and side grain formation part 121*u*2 serve as flow stopper part 121*a*. The pattern of projections and depressions of grain formation part 121*u*1 and side grain formation part 121*u*2 may be appropriately set. The positions, sizes, numbers and the like of grain formation part 121*u*1 and side grain formation part 121*u*2 are not limited to those of the present modification. The above-described structures of flow stopper parts 121*a* may be appropriately combined.

In the present embodiment, as with lens holder 110, magnet holder 12*a* is formed with polyarylate (PAR) or a PAR alloy composed of different types of resins including PAR (e.g. PAR/PC).

With this configuration, a high welding power can be achieved, and thus toughness and impact resistance can be ensured even when magnet holder 12*a* is thinned. Accordingly, a small external size of lens driving device 1 can be achieved, and downsizing and weight reduction can be achieved.

Magnet Part

Figure 17:
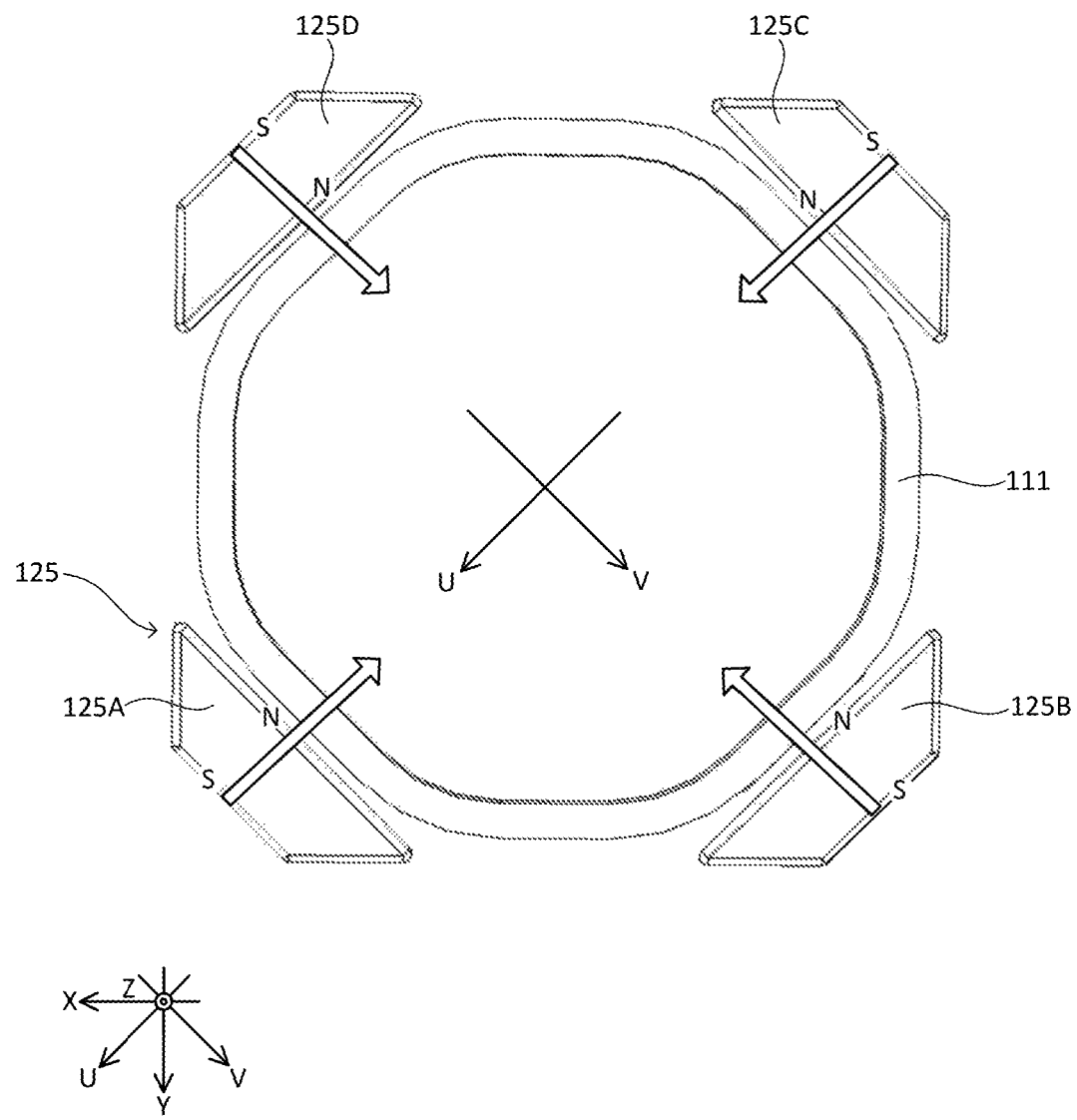
FIG. 17 is a plan view illustrating an orientation of a magnetic field in an AF movable part.

Magnet part 125 includes four rectangular columnar permanent magnets, 125A to 125D (see FIG. 17). Permanent magnets 125A to 125D are fixed to magnet installation part 120*c* by bonding, for example. In the present embodiment, in plan view, each of permanent magnets 125A to 125D has a substantially isosceles trapezoidal shape.

With this configuration, the corner spaces of magnet holder 12*a* (to be more specific, magnet installation part 120*c*) can be effectively utilized. As illustrated in FIG. 17, permanent magnets 125A to 125D are magnetized such that a traversing magnetic field in the radial direction is formed at AF coil part 111. In the present embodiment, permanent magnets 125A to 125D are magnetized such that the inner periphery side and the outer periphery side thereof are set to N pole and S pole, respectively.

The end surfaces (rear surfaces) of permanent magnets 125A to 125D on the −side in the Z direction protrude to the −side in the Z direction over magnet holder 12*a* (see FIG. 6). That is, the height of OIS movable part 10 is defined by permanent magnets 125A to 125D. With this configuration, the height of OIS movable part 10 can be minimized in accordance with the size of permanent magnets 125A to 125D for ensuring the magnetic force, and thus height reduction of lens driving device 1 can be achieved.

The AF voice coil motor is configured with magnet part 125 and AF coil part 111 with the above-mentioned configuration. In addition, magnet part 125 serves as the AF magnet part and as the OIS magnet part.

Upper Elastic Supporting Part

As illustrated in FIG. 9A, upper elastic supporting part 13 (hereinafter referred to as "upper leaf spring 13") is composed of a pair of upper spring elements 13*a* and 13*b*. Each of upper spring elements 13*a* and 13*b* is a leaf spring made of beryllium copper, nickel copper, or stainless-steel or the like, for example.

Of upper spring elements 13*a* and 13*b*, upper spring element 13*a* includes a pair of outer fixing parts 130 configured to be fixed to the surface of magnet holder 12*a* on the +side in the Z direction (specifically, upper spring fixing part 120*e*1), and inner fixing part 131 configured to be fixed to the surface of lens holder 110 on the +side in the Z direction (specifically, upper spring fixing part 110*f*). It is to be noted that the structure of upper spring element 13*b* is similar to the structure of upper spring element 13*a*. In view of this, the parts of upper spring element 13*b* similar to those of upper spring element 13a are denoted with the same reference numerals as those of upper spring element 13a, and detailed description thereof is omitted.

The pair of outer fixing parts 130 and inner fixing part 131 can be relatively displaced in the Z direction. To achieve such relative displacement, in the present embodiment, upper spring element 13a includes displacement allowance part 132 that allows for relative displacement of the pair of outer fixing parts 130 and inner fixing part 131 based on the elastic deformation thereof.

To be more specific, the pair of outer fixing parts 130 includes a pair of wire fixing parts 130a and 130b. Wire fixing part 130a and 130b are respectively disposed on the +side, in the Z direction, of arc grooves 120a (see FIG. 6) of magnet holder 12a where suspension wires 30D and 30A are disposed (i.e. fixing part 130a and 130b are disposed at the fourth corner part and the first corner part, respectively). It is to be noted that, in upper spring element 13b, wire fixing parts 130a and 130b are respectively disposed on the +side, in the Z direction, of arc grooves 120a of magnet holder 12a where suspension wires 30B and 30C are disposed (i.e. wire fixing parts 130a and 130b are disposed at the second corner part and the third corner part, respectively).

The other ends (upper ends) of suspension wires 30D and 30A (in the case of upper spring element 13b, suspension wires 30B and 30C) are fixed to wire fixing parts 130a and 130b by soldering.

Outer fixing part 130 includes a pair of first outer through holes 130c and 130d to which stopper protrusions 121 of magnet holder 12a are inserted.

Further, outer fixing part 130 includes a plurality of (the present embodiment, four) second outer through holes 130e to which upper bosses 120f1 (in the case of upper spring element 13b, upper bosses 120f2) of magnet holder 12a are inserted.

Inner fixing part 131 is disposed inside outer fixing part 130 in the radial direction. Inner fixing part 131 includes a pair of inner through holes 131a to which upper bosses 110g (in the case of upper spring element 13b, upper bosses 110i) of lens holder 110 is inserted.

Displacement allowance part 132 is composed of a pair of displacement permission elements 132a and 132b. The pair of displacement permission elements 132a and 132b are slender members extending in the circumferential direction, and connect between inner fixing part 131 and the pair of outer fixing parts 130. Displacement permission elements 132a and 132b include therein meandering parts 132c and 132d, respectively.

It is to be noted that the pair of upper spring elements 13a and 13b is connected to AF coil part 111 by soldering at the pair of tying parts 110n.

Lower Elastic Supporting Part

Figure 9B:
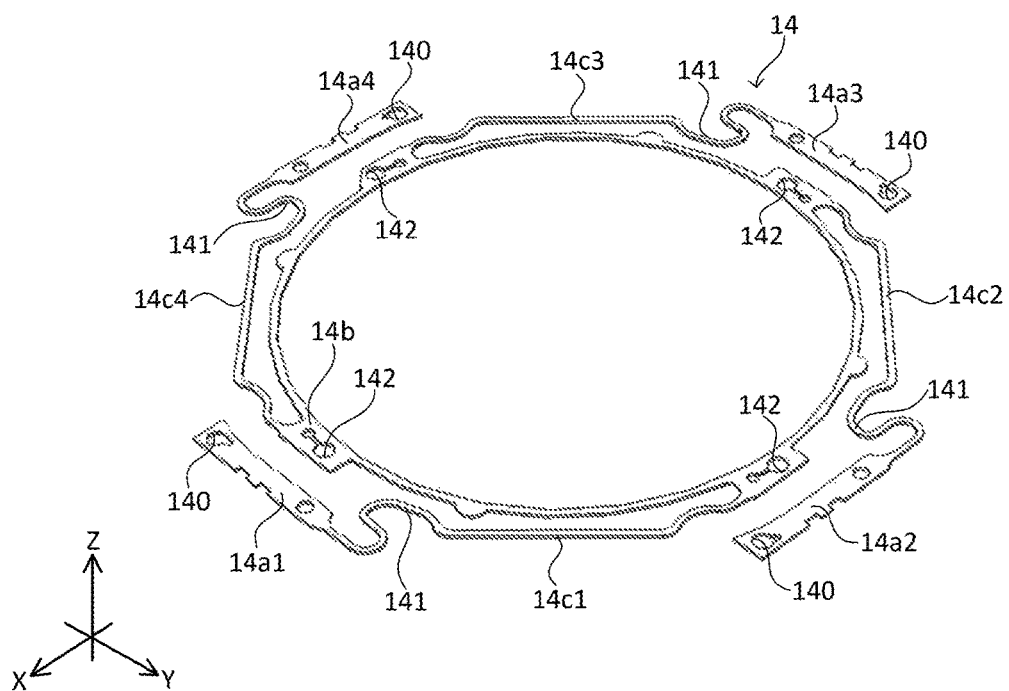
FIG. 9B is a perspective view of a lower elastic supporting part.

As illustrated in FIG. 9B, lower elastic supporting part 14 (hereinafter referred to as "lower leaf spring 14"), as with upper leaf spring 13, is a leaf spring made of beryllium copper, nickel copper, stainless-steel or the like for example, and has a square shape in its entirety in plan view. Lower leaf spring 14 elastically supports AF movable part 11 with respect to AF fixing part 12.

Lower leaf spring 14 includes four outer fixing parts 14a1 to 14a4 configured to be fixed to magnet holder 12a (to be more specific, lower spring fixing part 120d), and inner fixing part 14b configured to be fixed to lens holder 110 (to be more specific, lower spring fixing parts 110k).

Outer fixing parts 14a1 to 14a4 and inner fixing part 14b can be relatively displaced in the Z direction. To achieve such relative displacement, in the present embodiment, lower leaf spring 14 includes displacement allowance parts 14c1 to 14c4 that allow for relative displacement of outer fixing parts 14a1 to 14a4 and inner fixing part 14b based on the elastic deformation thereof.

To be more specific, each of outer fixing parts 14a1 to 14a4 includes outer through hole 140 to which lower boss 120d1 of magnet holder 12a is inserted. It is to be noted that the structure of outer fixing part is not limited to that of the present embodiment.

Inner fixing part 14b has a circular shape, and disposed inside outer fixing parts 14a1 to 14a4 in the radial direction. Inner fixing part 14b having such a configuration includes, at four places shifted from each other by 90 degrees in the circumferential direction, inner through hole 142 to which lower boss 110m of lower spring fixing part 110k of lens holder 110 is inserted.

It is to be noted that, in the present embodiment, inner through holes 142 and outer fixing parts 14a1 to 14a4 are disposed in a positional relationship in substantially the same phase in the circumferential direction. It is to be noted that the structure of the inner fixing part is not limited to that of the present embodiment.

Each of displacement allowance parts 14c1 to 14c4 is a slender member extending in the circumferential direction, and connects between outer fixing parts 14a1 to 14a4 and inner fixing part 14b. Each of displacement allowance parts 14c1 to 14c4 includes therein meandering part 141.

To be more specific, one end (also referred to as inner end in the radial direction) of each of displacement allowance parts 14c1 to 14c4 is connected with a portion near a portion where inner through hole 142 is provided in inner fixing part 14b. On the other hand, the other ends (in the radial direction outer end also referred to as) of displacement allowance parts 14c1 to 14c4 are respectively connected with outer fixing parts 14a1 to 14a4 provided at positions shifted from each other by approximately 90 degrees from the portion where one ends of displacement allowance parts 14c1 to 14c4 are fixed.

OIS Fixing Part

Figure 18:
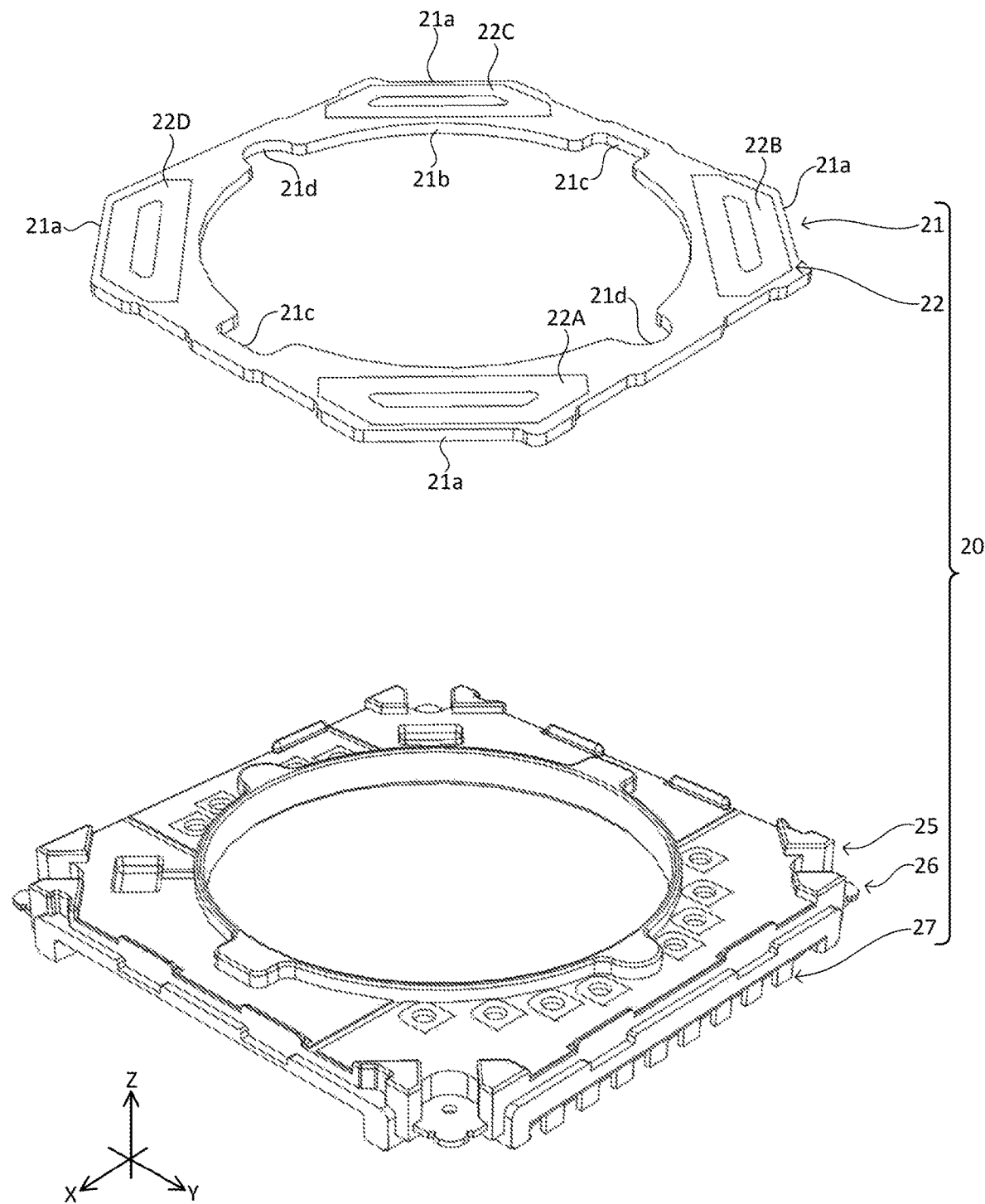
FIG. 18 is an exploded perspective view of an OIS fixing part.
Figure 19:
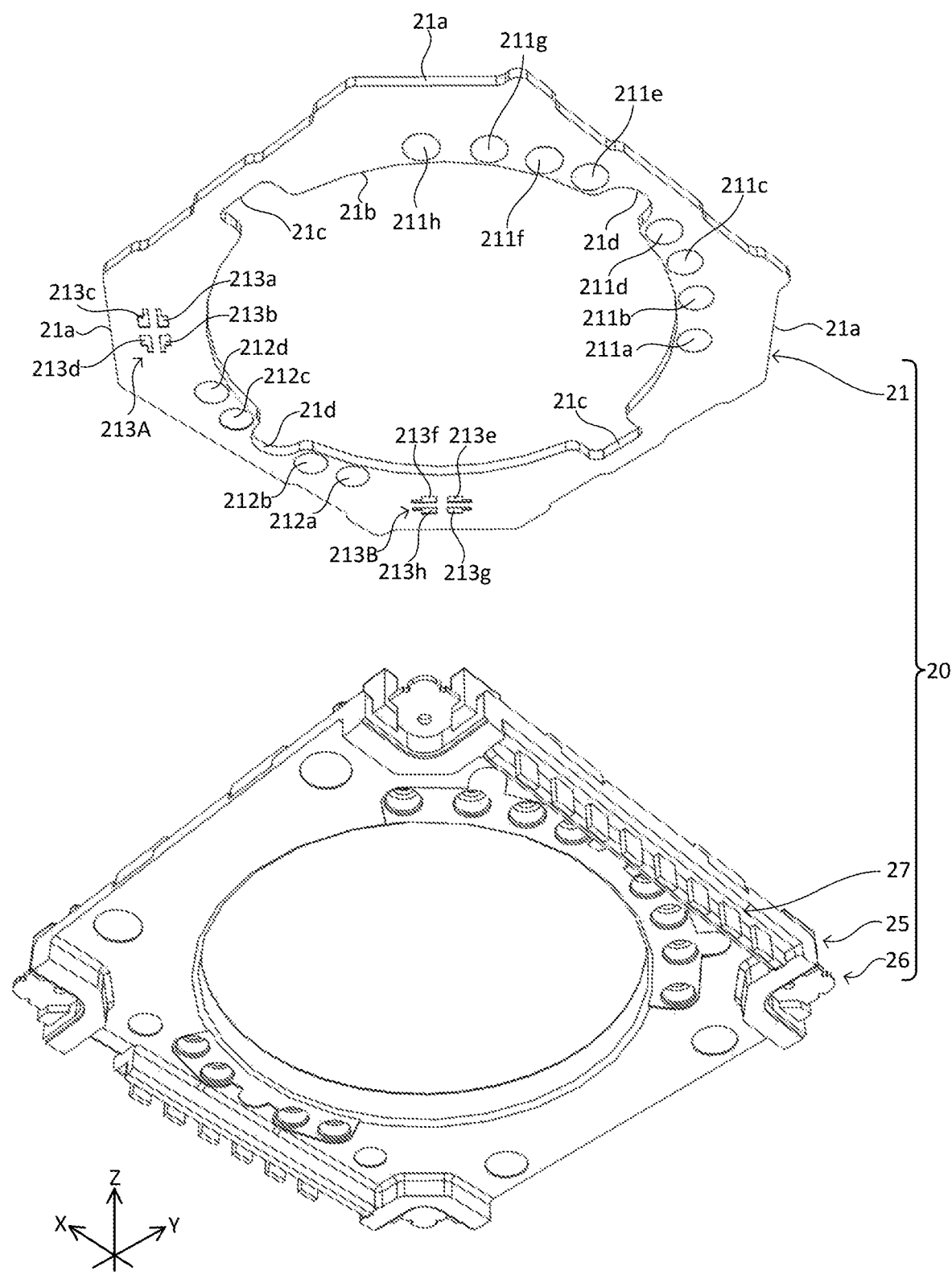
FIG. 19 is an exploded perspective view of the OIS fixing part as viewed at a different angle than FIG. 18.

FIG. 18 and FIG. 19 are exploded perspective views of OIS fixing part 20. As illustrated in FIG. 18 and FIG. 19, OIS fixing part 20 includes coil substrate 21, base member 25, terminal member 27, lead 26 and the like.

Coil Substrate

Coil substrate 21 is a substrate having a substantially octagonal shape in plan view with chamfered parts 21a at the four corners thereof. Center parts of suspension wires 30A to 30D are located outside chamfered parts 21a in the radial direction. Accordingly, suspension wires 30A to 30D are not locked by coil substrate 21.

Coil substrate 21 includes circular opening 21b at the center thereof. Coil substrate 21 includes a pair of first cutouts 21c at portions opposite to each other in the first direction (e.g. the X direction) at the inner peripheral edge of opening 21b.

In addition, coil substrate 21 includes a pair of first cutouts 21d at portions opposite to each other in the second direction (e.g. the Y direction) at the inner peripheral edge of opening 21b. That is, first cutouts 21c and second cutouts 21d are alternately provided in the circumferential direction at intervals of 90 degrees at the inner peripheral edge of opening 21b.

Each first cutout 21c has a rectangular shape as viewed in plan view in the Z direction. On the other hand, each second cutout 21d has a semicircular shape as viewed in plan view in the Z direction. First cutouts 21c and second cutouts 21d are configured to position coil substrate 21 with respect to base member 25 described later.

Coil substrate 21 includes OIS coil part 22 at positions opposite to magnet parts 125 (see FIG. 7 and FIG. 8) in the Z direction (light axis direction). OIS coil part 22 includes four OIS coils, 22A to 22D, corresponding to permanent magnets 125A to 125D.

The sizes and/or installation positions of OIS coils 22A to 22D and permanent magnets 125A to 125D are set such that the magnetic fields radiated from the bottom surfaces of permanent magnets 125A to 125D respectively traverse the long side portions of OIS coils 22A to 22D in the Z direction. Magnet part 125 and OIS coil part 22 serve as an OIS voice coil motor.

Coil substrate 21 includes a coil line (omitted in the drawing) and a Hall device line (omitted in the drawing). The coil line is connected with OIS coils 22A to 22D, and supplies power. The Hall device line is connected with Hall devices 23A and 23B held on a surface (rear surface) of coil substrate 21 on the −side in the Z direction.

The Hall device line is a line for signal input to Hall devices 23A and 23B, or signal output from Hall devices 23A and 23B. In the present embodiment, Hall device 23A is provided at the fourth corner part of the rear surface of coil substrate 21. On the other hand, Hall device 23B is provided at the third corner part of the rear surface of coil substrate 21.

Coil substrate 21 includes in the rear surface thereof a plurality of (in the present embodiment, eight) first lands, 211*a* to 211*h* (also referred to as substrate side connecting parts). Each of first lands 211*a* to 211*h* is connected to an end portion of a Hall device line (omitted in the drawing) installed in coil substrate 21.

To be more specific, first lands 211*a* to 211*h* are provided along the periphery of opening 21*b* in a half portion, of the rear surface of coil substrate 21, on one side in a predetermined direction (specifically, the +side in the Y direction). In the present embodiment, each of first lands 211*a* to 211*h* has a circular shape in plan view in the Z direction (light axis direction).

Coil substrate 21 includes in the rear surface thereof a plurality of (the present embodiment, four) second lands, 212*a* to 212*d* (also referred to as substrate side connecting parts). Each of second lands 212*a* to 212*d* is connected with an end portion of a coil line (omitted in the drawing) installed in coil substrate 21.

To be more specific, second lands 212*a* to 212*d* are provided along the periphery of opening 21*b* in a half portion, of the rear surface of coil substrate 21, on the other side in the predetermined direction (the −side in the Y direction).

In the present embodiment, first lands 211*a* to 211*h* and second lands 212*a* to 212*d* are provided along the periphery of opening 21*b*. Accordingly, in comparison with the configuration in which first lands 211*a* to 211*h* and second lands 212*a* to 212*d* are disposed in outer peripheral edge parts of coil substrate 21, the outer peripheral edge part of OIS coils 22A to 22D can be disposed nearer to the outer peripheral edge part of coil substrate 21. With this configuration, the size of OIS coils 22A to 22D can be maximized with respect to coil substrate 21.

In the present embodiment, each of second lands 212*a* to 212*d* has a circular shape in plan view in the Z direction (light axis direction). Second lands 212*a* and 212*c* are connected with the negative electrode of the power supply device through coil terminal elements 271*a* and 271*c* described later (also referred to as first terminal pair). Second lands 212*b* and 212*d* are connected with the positive electrode of the power supply device through coil terminal elements 271*d* and 271*b* described later (also referred to as first terminal pair).

Coil substrate 21 includes Hall device lands 213A and 213B at the fourth corner part and the third corner part of the rear surface (see FIG. 19). Hall device land 213A provided at the fourth corner part includes a plurality of (in the present embodiment, four) Hall device land elements, 213*a* to 213*d*.

On the other hand, Hall device land 213B provided at the third corner part includes a plurality of (the present embodiment, four) Hall device land elements, 213*e* to 213*h*. Hall device land elements 213*a* to 213*d* of Hall device land 213A are connected with the terminal of Hall device 23A. Hall device land elements 213*e* to 213*h* of Hall device land 213B are connected with the terminal of Hall device 23B.

In the present embodiment, first lands 211*a* to 211*h*, and Hall device land elements 213*a* to 213*h* are provided in respective half portions opposite to each other in a predetermined direction (specifically, the Y direction). First lands 211*a* to 211*h* are connected with Hall device land elements 213*a* to 213*h*, respectively, through the hole line. FIG. 25 illustrates a connection relationship between first lands 211*a* to 211*h* and Hall device land elements 213*a* to 213*h*.

In addition, the first end portion of OIS coil 22A provided at the first corner part and the first end portion of OIS coil 22C provided at the third corner part are connected with each other through the coil line. The second end portion of OIS coil 22A is connected with second land 212*a*. On the other hand, the second end portion of OIS coil 22C is connected with second land 212*b*.

In addition, the first end portion of OIS coil 22B provided at the second corner part and the first end portion of OIS coil 22D provided at the fourth corner part are connected through the coil line. The second end portion of OIS coil 22B is connected with second land 212*d*. On the other hand, the second end portion of OIS coil 22D is connected with second land 212*c*.

Base Member

Figure 20A:
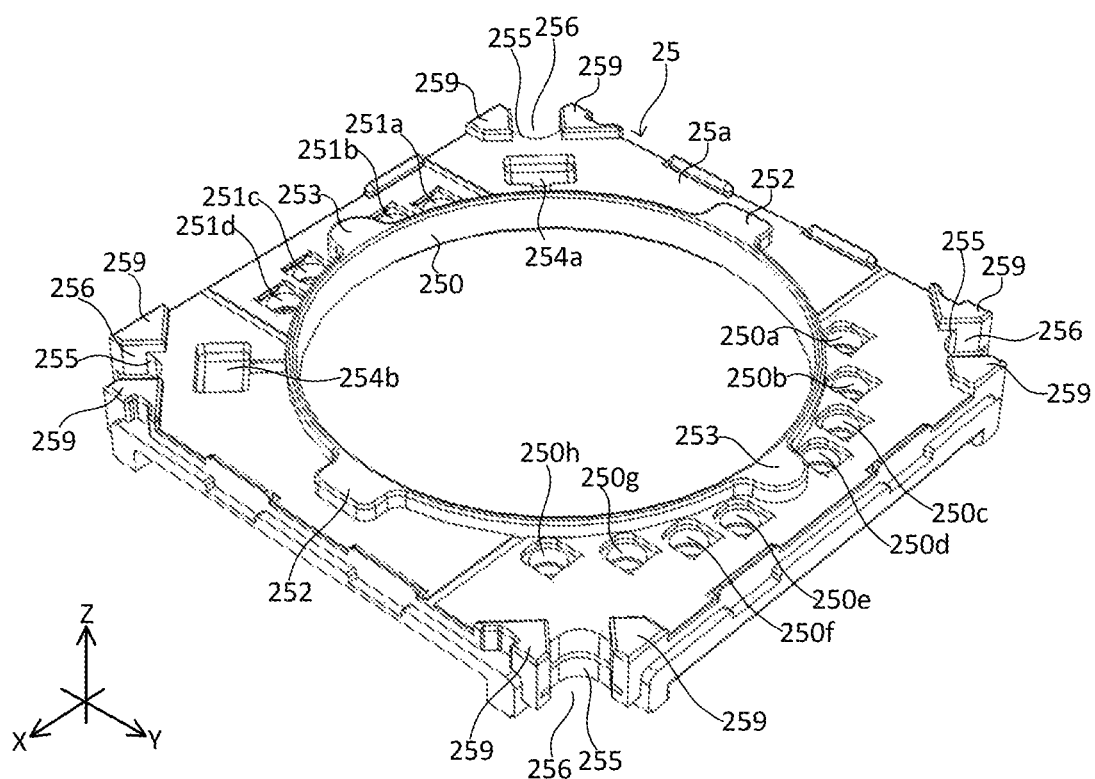
FIG. 20A is an exploded perspective view of a base member.
Figure 20B:
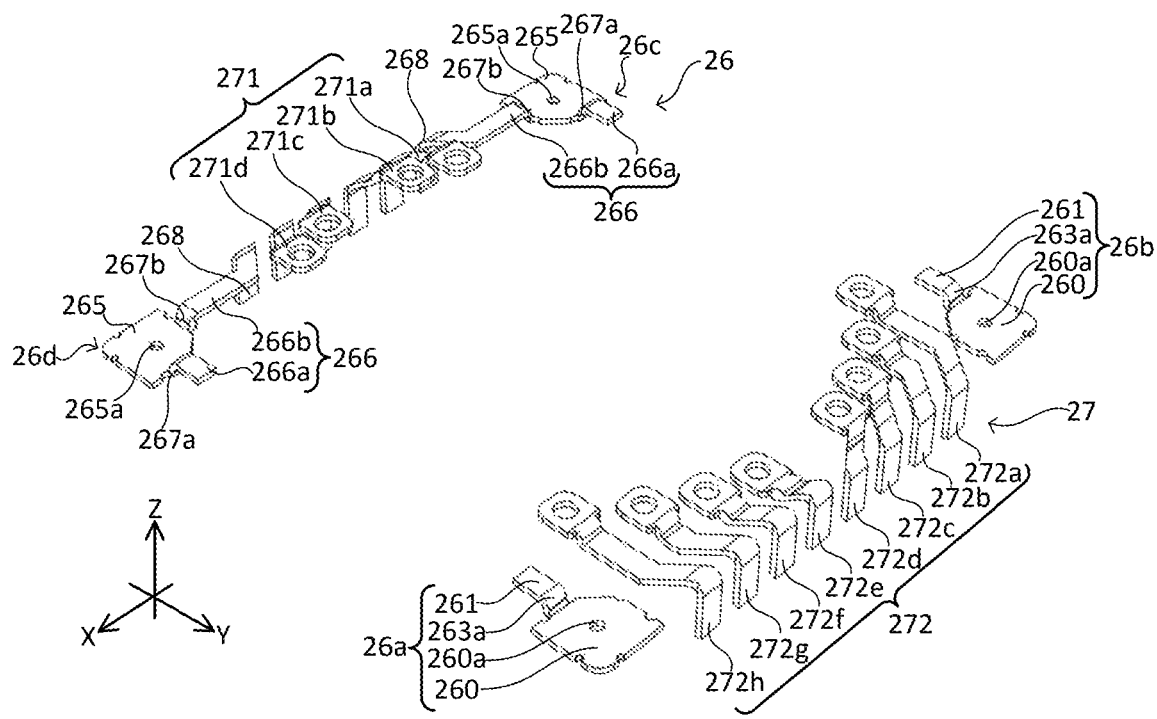
FIG. 20B is an exploded perspective view of a lead and a terminal member.
Figure 21A:
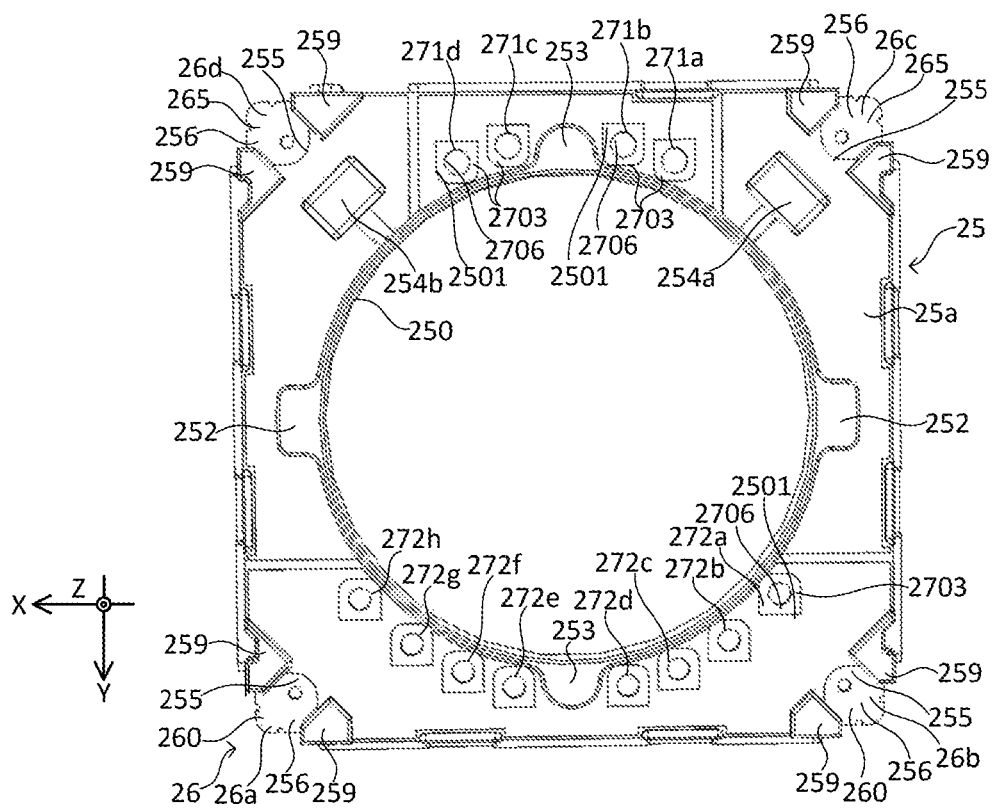
FIG. 21A and FIG. 21B illustrate a configuration of a base.
Figure 21B:
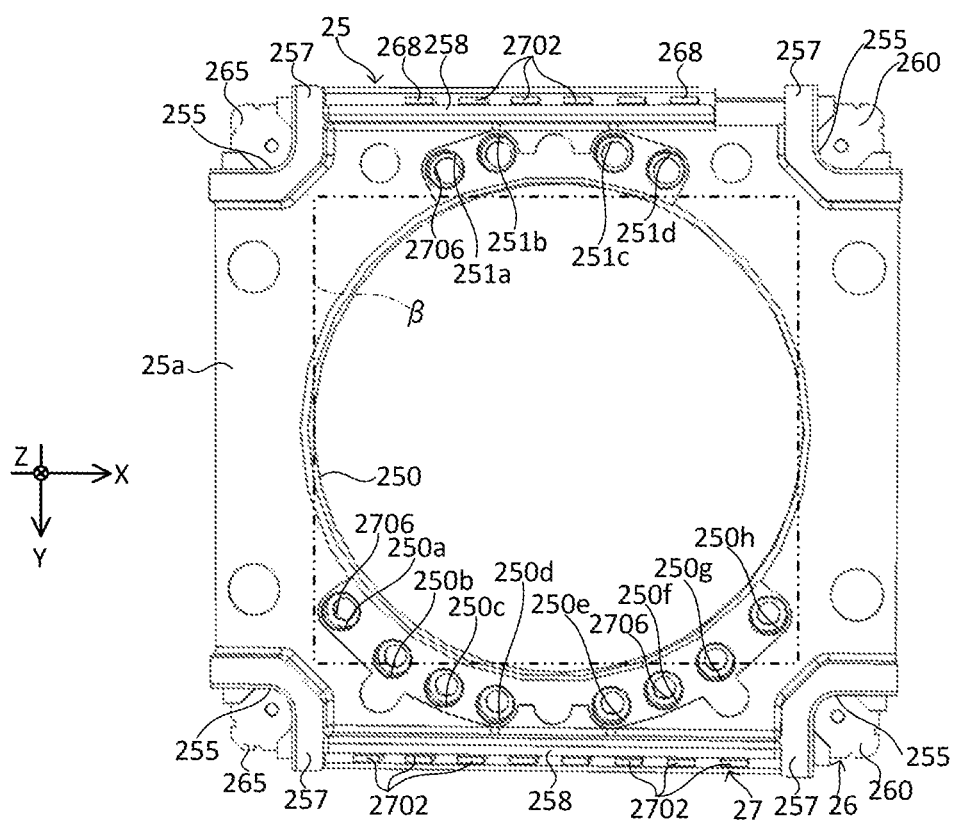

FIG. 20A is a perspective view of base member 25, and FIG. 20B is a perspective view of lead 26 and terminal member 27. Base member 25 is a supporting member that supports coil substrate 21. FIG. 21A is a plan view of base member 25 in which lead 26 and terminal member 27 are embedded, and FIG. 21B is a bottom view of base member 25 in which lead 26 and terminal member 27 are embedded.

Base member 25 is made of a non-conductive material such as synthetic resins. For example, base member 25 is made of liquid crystal polymer (LCP), and includes base main body 25*a* that is a plate member having a substantially square shape in plan view.

Base main body 25*a* includes circular opening 250 at the center thereof. Base main body 25*a* includes first protrusions 252 at two positions opposite to each other in the first direction (e.g. the X direction) at the periphery of opening 250.

First protrusion 252 has a rectangular shape in plan view in the Z direction. First cutout 21*c* of coil substrate 21 is locked to first protrusion 252 from the +side in the Z direction.

In addition, base main body 25*a* includes second protrusions 253 at two positions opposite to each other in the second direction (e.g. the Y direction) at the periphery of opening 250. Second protrusion 253 has a semicircular shape as viewed in plan view in the Z direction. Second cutout 21*d* of coil substrate 21 is locked to second protrusion 253 from the +side in the Z direction.

Base main body 25a includes Hall-device recesses 254a and 254b at two corners (i.e. the third corner part and the fourth corner part) on the −side in the Y direction on the surface (front surface) on the +side in the Z direction. In the assembled state, Hall device recesses 254a and 254b are located on the −side of OIS coils 22C and 22D, respectively in the Z direction.

Hall device 23A is housed in Hall device recess 254a, and Hall device 23B is housed in Hall device recess 254b (see FIG. 8). By detecting the magnetic field formed by magnet part 125 with Hall devices 23A and 23B, the position of OIS movable part 10 in the plane orthogonal to the optical axis can be specified.

Base main body 25a includes a plurality of (in the present embodiment, eight) first through holes, 250a to 250h (also referred to as base side through holes) extending from the front surface to the rear surface around opening 250. To be more specific, first through holes 250a to 250h are provided along the periphery of opening 250 in a half portion of base main body 25a on one side in a predetermined direction (specifically, on the +side in the Y direction).

Solder 28 for connecting terminal member 27 and coil substrate 21 is disposed inside each of first through holes 250a to 250h.

In the present embodiment, each of first through holes 250a to 250h has a circular shape in plan view in the Z direction (light axis direction). In the assembled state, first through holes 250a to 250h overlap first lands 211a to 211h, respectively, of coil substrate 21 in the optical axis direction (Z direction).

Figure 23:
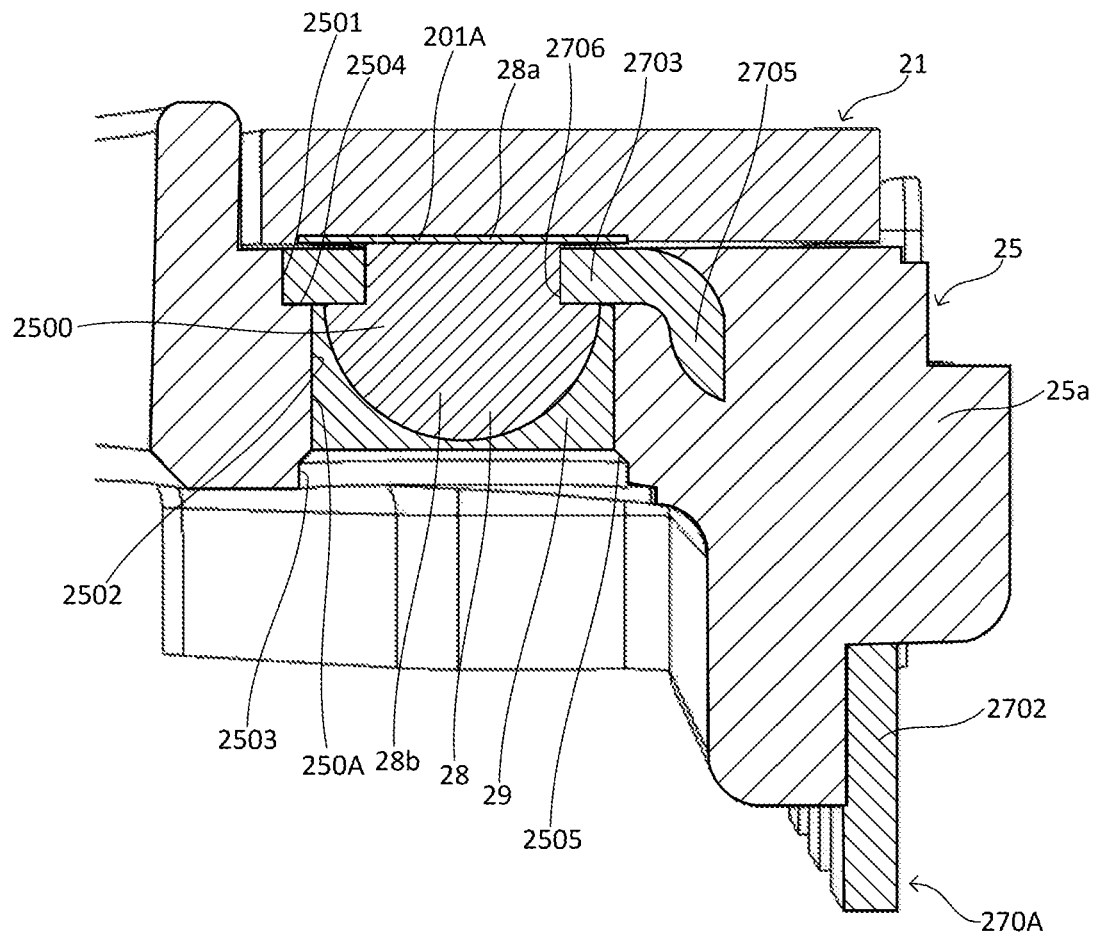
FIG. 23 is a sectional view for describing a connection state of a coil substrate and a terminal member.

The structures of first through holes 250a to 250h are described below with reference to FIG. 23. FIG. 23 illustrates through hole 250A having a configuration same as that of first through holes 250a to 250h and second through holes 251a to 251d described later for convenience of description. In addition, FIG. 23 illustrates terminal element 270A having a basic configuration same as that of coil terminal elements 271a to 271d and Hall device terminal elements 272a to 272h described later. Further, FIG. 23 illustrates land 201A having a structure same as that of first lands 211a to 211h and second lands 212a to 212d of coil substrate 21.

Through hole 250A includes terminal through hole 2501, soldering through hole 2502, and flow stopping through hole 2503 in this order from one end side in the own axis direction (the +side in the Z direction).

Inside terminal through hole 2501, second connecting part 2703 of terminal member 27 described later (specifically, coil terminal member 271 and Hall device terminal member 272) is disposed. Terminal through hole 2501 is provided in through hole 250A in one end portion of through hole 250A in the axis direction. Terminal through hole 2501 has a substantially rectangular shape in plan view in the optical axis direction (Z direction). One end (an end portion on the +side in the Z direction) of terminal through hole 2501 opens at the front surface of base main body 25a.

The other end (the end portion on the −side in the Z direction, and the lower end in FIG. 23) of terminal through hole 2501 is continuous with one end of (the end portion on the +side in the Z direction, and the upper end in FIG. 23) soldering through hole 2502 described later through first step 2504. First step 2504 is a flat surface facing the +side in the Z direction.

Solder 28 and resin 29 described later are disposed inside soldering through hole 2502. Soldering through hole 2502 is filled with solder 28 and resin 29. Soldering through hole 2502 is provided in through hole 250A at a middle part of through hole 250A in the axis direction. The inner diameter of soldering through hole 2502 is greater than that of terminal through hole 2501.

Soldering through hole 2502 has a circular shape in plan view in the optical axis direction (Z direction). In plan view in the optical axis direction (Z direction), soldering through hole 2502 is disposed inside the outer peripheral edge of terminal through hole 2501.

As described above, one end (the end portion on the +side in the Z direction) of soldering through hole 2502 is continuous with terminal through hole 2501 through first step 2504. On the other hand, the other end (the end portion on the −side in the Z direction) of soldering through hole 2502 is continuous with flow stopping through hole 2503 described later through second step 2505.

Second step 2505 is an inclined surface that is tilted such that it goes the −side in the Z direction as it goes outward in the radial direction of through hole 250A. It is to be noted that second step 2505 may be a flat surface which is not tilted.

Together with second step 2505, flow stopping through hole 2503 contributes to prevention of outflow of resin 29 described later. Flow stopping through hole 2503 is provided at the other end portion (the end portion on the −side in the Z direction) in the axis direction of through hole 250A. Flow stopping through hole 2503 has a circular shape in plan view in the optical axis direction (Z direction).

As described above, one end (the end portion on the +side in the Z direction) of flow stopping through hole 2503 is continuous with soldering through hole 2502 through second step 2505. On the other hand, the other end (the end portion on the −side in the Z direction) of flow stopping through hole 2503 opens at the rear surface of base main body 25a.

Base main body 25a includes a plurality of (the present embodiment, four) second through holes, 251a to 251d, which extend from the front surface to the rear surface around opening 250. To be more specific, second through holes 251a to 251d are provided along the periphery of opening 250 in the half portion of base main body 25a on the other side in a predetermined direction (specifically, the −side in the Y direction).

In the present embodiment, each of second through holes 251a to 251d has a circular shape in plan view in the Z direction (light axis direction). In the assembled state, second through holes 251a to 251d overlap second lands 212a to 212d, respectively, of coil substrate 21 in the optical axis direction (Z direction).

As with through hole 250A (see FIG. 23), each of second through holes 251a to 251d includes terminal through hole 2501, soldering through hole 2502, and flow stopping through hole 2503 in this order from the one end side (the +side in the Z direction) in the own axis direction. Terminal through hole 2501, soldering through hole 2502, and flow stopping through hole 2503 are identical to those of through hole 250A (i.e. first through holes 250a to 250h), and therefore the description thereof is omitted.

Base main body 25a includes at the four corners thereof lead cutout parts 255 (see FIG. 20A and FIG. 21A) recessed inward in the radial direction. Lead installation spaces 256 (see FIG. 20A and FIG. 21A) are defined at portions surrounded by lead cutout parts 255. Lead installation spaces 256 open to both sides in the Z direction, and to the outside in the radial direction.

Base main body 25a includes, on the front surface thereof, pairs of first reinforcement ribs 259 at the peripheries of lead cutout parts 255 (see FIG. 20A and FIG. 21A).

Base main body 25a includes, on the surface (rear surface) on the −side in the Z direction, base leg parts 257 (see FIG. 21B) protruding from the rear surface to the −side in the Z direction at the peripheries of lead cutout parts 255. Each base leg part 257 has a substantially L-shape as viewed in plan view in the Z direction, and the outer surface of base leg part 257 in the radial direction is continuous with the outer surface of lead cutout part 255 in the Z direction.

The end portion (front end portion) on the −side in the Z direction of base leg part 257 is located on the −side in the Z direction relative to base main body 25a. A half portion of lead installation space 256 on the −side in the Z direction is formed in a portion surrounded by base leg part 257. With base leg part 257, lead installation space 256 can be expanded, to the −side in the Z direction, more than in a configuration in which no base leg part 257 is provided.

In addition, in the assembled state, base leg part 257 can be lengthened to the −side in the Z direction as long as base leg part 257 does not make contact with the sensor substrate of the image pickup part.

Base main body 25a includes, on the surface (rear surface) of base main body 25a on the −side in the Z direction, second base leg parts 258 protruding from the rear surface to the −side in the Z direction at positions along the two sides opposite to each other in the first direction (e.g. the Y direction). The position of the end surface (end surface) of each second base leg part 258 on the −side in the Z direction is located on the −side in the Z direction relative to the end surface of base leg part 257.

Each of first reinforcement ribs 259, base leg parts 257, and second base leg parts 258 increases the mechanical strength of base main body 25a. Thus, reduction in the thickness of base main body 25a can be achieved.

Base main body 25a is attached to cover 4 by applying an adhesive agent (e.g. epoxy resin) to a portion surrounded by base leg part 257 in lead installation space 256.

It is to be noted that in the assembled state of camera module A, the imaging device (not illustrated) held by the sensor base (not illustrated) is disposed at the position indicated with the chain double-dashed line 13 on the −side of base main body 25a in the Z direction in FIG. 21B. The sensor base having the above-mentioned configuration is fixed to the front surface (the surface on the +side in the Z direction) of the sensor substrate (not illustrated). In such an assembled state, the end surface (the surface on the −side in the Z direction) of base leg part 257 of base member 25 does not make contact with the sensor substrate.

Lead

As illustrated in FIG. 20B and FIG. 22, lead 26 (also referred to as wire connecting member) is a leaf spring made of a conductive material such as beryllium copper, nickel copper, stainless-steel.

In OIS fixing part 20, lead 26 is a portion that supports OIS movable part 10. One end (lower end) of suspension wire 30 (30A to 30D) is fixed to lead 26. In addition, as necessary, lead 26 serves as a transmission path of a control signal or a power supply path to suspension wire 30 (30A to 30D).

Lead 26 includes an embedding part (e.g. first embedding part 261 and second embedding part 266 described later) configured to be embedded in base main body 25a, and a plurality of (the present embodiment, four) wire connecting parts (e.g. first wire connecting part 260 and second wire connecting part 265 described later) configured to be exposed from base member 25. In addition, lead 26 may include a plurality of (in the present embodiment, two) terminal parts (e.g. lead terminal part 268 described later) configured to be exposed from base member 25.

The embedding part fixes lead 26 to base main body 25a by being embedded in base member 25. On the other hand, each wire connecting part and each terminal part are exposed from base member 25. For example, the wire connecting parts are exposed from base member 25 at the first to fourth corner parts. Each terminal part is exposed from base member 25 in a region near the third corner part and the fourth corner part.

One ends (lower ends) of suspension wires 30A to 30D are fixed to respective wire connecting parts. Each wire connecting part is located on the −side of the embedding part in the Z direction (or in other words, located at a position remote from OIS movable part 10).

Now a structure of lead 26 is elaborated with reference to FIG. 20B and FIG. 22. Lead 26 includes a pair of first lead elements 26a and 26b and a pair of second lead elements 26c and 26d. The pair of first lead elements 26a and 26b and the pair of second lead elements 26c and 26d are disposed at the four corners of base member 25.

To be more specific, the pair of first lead elements 26a and 26b are adjacent to each other in the X direction at the first corner part and the second corner part, respectively. On the other hand, the pair of second lead elements 26c and 26d are adjacent to each other in the X direction at the third corner part and the fourth corner part, respectively.

Each of the pair of first lead elements 26a and 26b includes first wire connecting part 260 and first embedding part 261. The structures of first lead elements 26a and 26b are symmetric in the X direction. In view of this, first lead element 26a is described below. First lead element 26b is described as necessary.

First wire connecting part 260 of first lead element 26a is a member having a substantially rectangular plate-shape in plan view in the Z direction, and includes first through hole 260a into which one end (lower end) of suspension wire 30A can be inserted. One end (lower end) of suspension wire 30B is inserted into first through hole 260a of first lead element 26b.

First embedding part 261 extend to −side in the X direction from first wire connecting part 260. The base end portion of first embedding part 261 is connected to first wire connecting part 260 through first step 263a.

First step 263a is tilted in a direction approaching first wire connecting part 260 toward the −side in the Z direction. In the present embodiment, first step 263a is embedded in base member 25. It is to be noted that first step 263a is not limited to the configuration illustrated in the drawing, and may be, for example, parallel to the Z direction.

That is, first step 263a may be orthogonal to first main body element 261a and first wire connecting part 260. With the configuration described above, first wire connecting part 260 is located on the −side of first embedding part 261 in the Z direction.

First lead element 26a is disposed at the first corner part of base member 25. In this state, first embedding part 261 and first step 263a are embedded in base member 25.

First wire connecting part 260 of first lead element 26a is disposed in lead installation space 256 of the first corner part of base member 25 in the state where first wire connecting part 260 is exposed from base member 25. It is to be noted that, in the present embodiment, a part of first wire connecting part 260 is also embedded in base member 25. That is, it suffices that at least a part of first wire connecting part 260 is exposed from base member 25.

On the other hand, first lead element 26b is disposed at the second corner part of base member 25. In this state, first embedding part 261 and first step 263a of first lead element 26b are embedded in base member 25.

First wire connecting part 260 of first lead element 26b is disposed in lead installation space 256 of the second corner part of base member 25 in the state where first wire connecting part 260 is exposed from base member 25.

Each of the pair of second lead elements 26c and 26d includes second wire connecting part 265 (also referred to as wire connecting part), second embedding elements 266a and 266b, and terminal part 268. The structures of second lead elements 26c and 26d are symmetric in the X direction. In view of this, second lead element 26c is described below. Second lead element 26d is described as necessary.

Second wire connecting parts 265 are plate members each having a substantially rectangular shape as viewed in plan view in the Z direction, and include second through holes 265a into which one ends (lower ends) of suspension wire 30C can be inserted. It is to be noted that one end (lower end) of suspension wire 30D is inserted into second through hole 265a of second lead element 26d.

Second embedding part 266 includes second embedding element 266a and second embedding element 266b. Second embedding element 266a extends to the +side in the Y direction from second wire connecting part 265. The base end portion of second embedding element 266a is continuous with second wire connecting part 265 through second step 267a.

Second embedding element 266b extends to the +side in the X direction from second wire connecting part 265. The base end portion of second embedding element 266b is continuous with second wire connecting part 265 through second step 267b. It is to be noted that, in second lead element 26d, second embedding element 266b extends to the −side in the X direction from second wire connecting part 265.

Each of second steps 267a and 267b is tilted such that as it goes toward second wire connecting part 265, it goes to the −side in the Z direction. It is to be noted that second steps 267a and 267b are not limited to the configuration illustrated in the drawing, and may be parallel to the Z direction, for example.

Specifically, second steps 267a and 267b may be orthogonal to second embedding part 266a and second wire connecting part 265. With this configuration, second wire connecting part 265 is located on the −side of second embedding part 266 in the Z direction.

Terminal part 268 is bent at substantially right angle to the −side in the Z direction from an end portion of second embedding element 266b.

Second lead element 26c is disposed at the third corner part in base member 25. In this state, second embedding part 266 and second steps 267a and 267b of second lead element 26c are embedded in base member 25.

Second wire connecting part 265 of second lead element 26c is disposed in lead installation space 256 of the third corner part of base member 25 in the state where second wire connecting part 265 is exposed from base member 25. In addition, terminal part 268 of second lead element 26c protrudes to the outside from the rear surface of base member 25 at the third corner part. It is to be noted that the position where terminal part 268 protrudes from base member 25 is located on the −side, in the Y direction, of second base leg part 258 located on the −side in the Y direction in the rear surface of base member 25 (see FIG. 21B).

On the other hand, second lead element 26d is disposed at the fourth corner part in base member 25. In this state, second embedding part 266 and second steps 267a and 267b of second lead element 26d are embedded in base member 25. In addition, terminal part 268 of second lead element 26d protrudes to the outside from the rear surface of base member 25 at the fourth corner part. It is to be noted that the position where terminal part 268 protrudes from base member 25 is located on the −side, in the Y direction, of second base leg part 258 located on the −side in the Y direction in the rear surface of base member 25 (see FIG. 21B).

Second wire connecting part 265 of second lead element 26d is disposed in lead installation space 256 of the fourth corner part of base member 25 in the state where second wire connecting part 265 is exposed from base member 25. It is to be noted that, in the present embodiment, a part of second wire connecting part 265 is also embedded in base member 25. That is, it suffices that at least a part of second wire connecting part 265 is exposed from base member 25.

Terminal Member

Figure 22A:
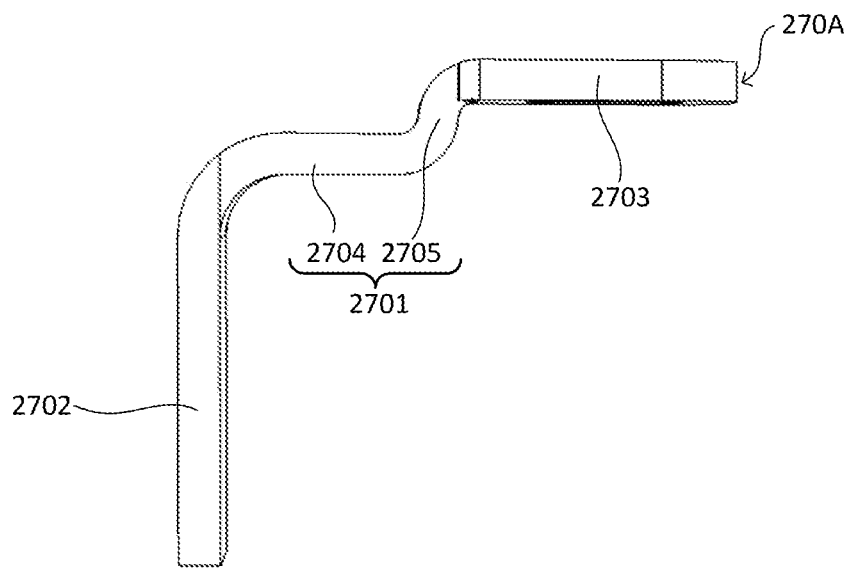
FIG. 22A is a side view of a terminal element.
Figure 22B:
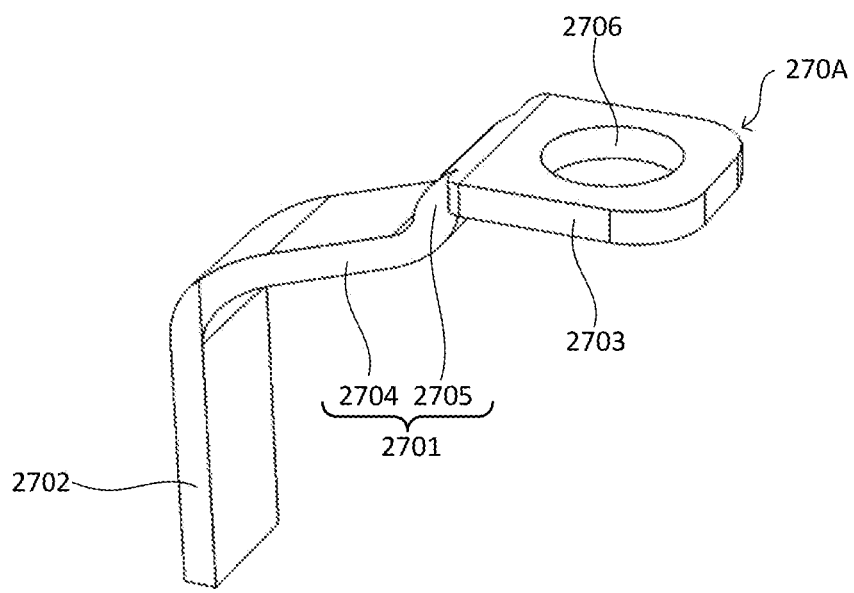
FIG. 22B is a perspective view of the terminal element.

As illustrated in FIGS. 20B, 22A and 22B, terminal member 27 is a plate-shaped member made of a conductive material such as beryllium copper, nickel copper, and stainless-steel. Terminal member 27 includes coil terminal member 271, and Hall device terminal member 272.

Coil terminal member 271 supplies power to OIS coils 22A to 22D. Coil terminal member 271 includes a plurality of (the present embodiment, four) coil terminal elements, 271a to 271d (also referred to as first terminal member). Coil terminal elements 271a to 271d are connected to corresponding to OIS coils 22A to 22D, respectively. Of coil terminal elements 271a to 271d, coil terminal elements 271b and 271d serve as a first terminal pair that is connected to the positive electrode of the power supply device. Of coil terminal elements 271a to 271d, coil terminal elements 271a and 271c serve as a first terminal pair that is connected to the negative electrode of the power supply device. Accordingly, terminal member 27 includes two pairs of the first terminal pair.

On the other hand, Hall device terminal member 272 is a terminal for signal input to Hall devices 23A and 23B, or signal output from Hall devices 23A and 23B. Hall device terminal member 272 includes a plurality of (in the present embodiment, eight) Hall device terminal elements 272a to 272h (also referred to as second terminal member). Hall device terminal elements 272a to 272h are connected to corresponding Hall devices 23A and 23B.

Each of coil terminal elements 271a to 271d and Hall device terminal elements 272a to 272h has a basic structure similar to that of terminal element 270A illustrated in FIGS. 22A, 22B, and 23. Each of coil terminal elements 271a to 271d and Hall device terminal elements 272a to 272h has a structure which is obtained by appropriately changing the structure of embedding part 2701 in terminal element 270A. Accordingly, the structure of terminal element 270A is described below with reference to FIG. 22A and FIG. 22B.

Terminal element 270A is a plate-shaped member having a substantially L-shape in its entirety, and includes embedding part 2701, first connecting part 2702, and second connecting part 2703.

Embedding part 2701 is a portion that is embedded in base member 25. The shape of embedding part 2701 is not limited. Embedding part 2701 connects first connecting part 2702 and second connecting part 2703 together. Embedding part 2701 includes flat plate part 2704 and step 2705 in this order from first connecting part 2702 side.

Flat plate part 2704 is continuous with the base end portion (the +side in the Z direction and the upper end portion of FIG. 22A and FIG. 22B) of first connecting part 2702.

The shape of flat plate part 2704 is appropriately determined in accordance with the position of a member to be connected to second connecting part 2703 (specifically, first lands 211a to 211h and second lands 212a to 212d of coil substrate 21).

Step 2705 is bent to the +side in the Z direction from the first end portion of flat plate part 2704 (the left end portion of FIG. 22A and FIG. 22B). In the present embodiment, the position of an end portion of step 2705 on the +side in the Z direction (the upper end portion in FIG. 22A and FIG. 22B) is the same among coil terminal elements 271a to 271d and Hall device terminal elements 272a to 272h.

For example, first connecting part 2702 is a portion that is connected to an external device (such as a power supply device and a control device) provided in the sensor substrate. First connecting part 2702 extends to the −side in the Z direction from the second end portion (the left end portion in FIG. 22A and FIG. 22B) of flat plate part 2704.

Accordingly, first connecting part 2702 and flat plate part 2704 are orthogonal to each other. In the present embodiment, the structure of first connecting part 2702 is the same among coil terminal elements 271a to 271d. It should be noted that the structure of first connecting part 2702 may differ among coil terminal elements 271a to 271d.

In the assembled state, a half portion of the tip end side (the −side in the Z direction and the lower end side in FIG. 22A and FIG. 22B) of first connecting part 2702 is exposed from base member 25. On the other hand, another half portion of the base side (the +side in the Z direction and the upper end side in FIG. 22A and FIG. 22B) of first connecting part 2702 is embedded in base member 25.

Second connecting part 2703 is a portion that is connected to coil substrate 21 (specifically, OIS coils 22A to 22D, Hall devices 23A and 23B and the like). Second connecting part 2703 is a plate-shaped member having a substantially rectangular shape in plan view in the Z direction, and is provided along the XY plane. Second connecting part 2703 includes at a center portion thereof connecting through hole 2706 (also referred to as terminal side through hole). The inner diameter of connecting through hole 2706 is smaller than the inner diameter of second through holes 251a to 251d and first through holes 250a to 250h of base 26 (see FIG. 21B and FIG. 23).

The first end portion (the left end portion in FIG. 22A and FIG. 22B) of second connecting part 2703 is continuous with the end portion of step 2705 of embedding part 2701 on the +side in the Z direction. In the assembled state, second connecting part 2703 is disposed in terminal through hole 2501 in through hole 250A (specifically, first through holes 250a to 250h and second through holes 251a to 251d) of base member 25 (FIG. 21A and see FIG. 23). In the assembled state, the front surface of second connecting part 2703 is exposed from the front surface of base member 25.

In the present embodiment, coil terminal elements 271a to 271d having a basic structure similar to that of terminal element 270A described above are disposed side by side at an end portion of base member 25 on the −side in the Y direction. To be more specific, at the end portion of base member 25 on the −side in the Y direction, coil terminal elements 271a to 271d are disposed in this order from the −side in the X direction.

First connecting parts 2702 of coil terminal elements 271a to 271d are protruded (exposed) to the outside from the end portion, on the −side in the Y direction, of the rear surface of base main body 25a (see FIG. 21B). To be more specific, first connecting parts 2702 of coil terminal elements 271a to 271d are protruded (exposed) to the outside from a portion on the −side, of second base leg part 258 of the −side in the Y direction, in the Y direction in the rear surface of base main body 25a.

Second connecting parts 2703 of coil terminal elements 271a to 271d are connected to second lands 212a to 212d of coil substrate 21 through solder 28 described later. With this configuration, coil terminal elements 271a to 271d are connected to any of OIS coils 22A to 22D held by coil substrate 21. It is to be noted that FIG. 25 illustrates a connection relationship between coil terminal elements 271a to 271d and second lands 212a to 212d of coil substrate 21.

On the other hand, Hall device terminal elements 272a to 272h having a basic structure similar to that of terminal element 270A described above are the disposed side by side at an end portion of base member 25 on the +side in the Y direction. To be more specific, at the end portion of base member 25 on the +side in the Y direction, Hall device terminal elements 272a to 272h are disposed in this order from the −side in the X direction.

First connecting parts 2702 of Hall device terminal elements 272a to 272h are protruded (exposed) to the outside from the end portion on the +side in the Y direction in the rear surface of base main body 25a (see FIG. 21B). To be more specific, first connecting parts 2702 of Hall device terminal elements 272a to 272h are protruded (exposed) to the outside from a portion on the +side, of second base leg part 258 of the +side in the Y direction, in the Y direction in the rear surface of base main body 25a.

In the present embodiment, first connecting parts 2702 of Hall device terminal elements 272a to 272h and coil terminal elements 271a to 271d are protruded from the rear surface of base main body 25a, and thus the area of the opposing surface of the peripheral surface of base main body 25a and the inner surface of cover 4 can be increased. The opposing surface is used as a bonding surface of cover 4 and base main body 25. With the increased area of the bonding surface, the coupling power between cover 4 and base main body 25 is strengthened. In addition, since the contact surface between cover 4 and base main body 25 increases, the rigidity against an external force pressing cover 4 is improved.

Second connecting parts 2703 of Hall device terminal elements 272a to 272h are respectively connected to first lands 211a to 211h of coil substrate 21 with solder 28 described later. With this configuration, Hall device terminal elements 272a to 272h are connected to any of Hall devices 23A and 23B held by coil substrate 21. It is to be noted that FIG. 25 illustrates a connection relationship between Hall device terminal elements 272a to 272h and first lands 211a to 211h of coil substrate 21.

Assembly of OIS Fixing Part

Now a method of electrically connecting coil substrate 21 and base member 25 together in assembly of OIS fixing part 20 having the above-mentioned configuration is described with reference to FIG. 23.

First, coil substrate 21 is disposed on the top surface of base member 25 in which lead 26 and terminal member 27 (coil terminal elements 271a to 271d and Hall device terminal elements 272a to 272h) are insert-molded. At this time, first protrusion 252 of base 16 is engaged with first cutout 21c of coil substrate 21, and second protrusion 253 is engaged with second cutout 21d of coil substrate 21. In addition, the front surface of base member 25 and the rear surface of coil substrate 21 are temporarily jointed with an adhesive agent. In this manner, separation of base member 25 and coil substrate 21 in the assembly can be prevented.

In this state, second connecting parts 2703 of Hall device terminal elements 272a to 272h, first lands 211a to 211h of coil substrate 21, and first through holes 250a to 250h of base member 25 are respectively opposite to each other in the Z direction. In addition, second connecting parts 2703 of coil terminal elements 271a to 271d, second lands 212a to 212d of coil substrate 21, and second through holes 251a to 251d of base member 25 are respectively opposite to each other in the Z direction.

A method of connecting Hall device terminal elements 272a to 272h and coil terminal elements 271a to 271d, and first lands 211a to 211h and second lands 212a to 212d of coil substrate 21 is described below with reference to terminal element 270A and land 201A of FIG. 23 as an example.

In the state where second connecting part 2703 of terminal element 270A (specifically, Hall device terminal elements 272a to 272h and coil terminal elements 271a to 271d), and land 201A of coil substrate 21 (specifically, first land 211a and second lands 212a to 212d) are opposite to each other in the Z direction, the opening on one end side (the +side in the Z direction) of through hole 250A of base member 25 (specifically, first through holes 250a to 250h and second through holes 251a to 251d) is sealed with land 201A. In this manner, soldering space 2500 is formed inside through hole 250A.

Soldering space 2500 opens only on the other end side (the −side in the Z direction) of through hole 250A, and other portions of soldering space 2500 are surrounded by the inner peripheral surface of through hole 250A, second connecting part 2703 of terminal element 270A, and land 201A. This configuration is effective for preventing outflow of solder 28.

Next, solder 28 is supplied to soldering space 2500 with a dispenser and the like from the opening of the other end side of through hole 250A.

Solidified solder 28 includes connecting part 28a and head part 28b. Connecting part 28a is disposed inside connecting through hole 2706 in second connecting part 2703.

Connecting part 28a has a substantially columnar shape, and the outer peripheral surface thereof is joined to the inner peripheral surface of connecting through hole 2706. One end surface (the surface on the +side in the Z direction) of connecting part 28a is joined to land 201A. In this manner, terminal element 270A and land 201A are electrically connected to each other.

Head part 28b is provided on the −side of connecting part 28a in the Z direction, and is disposed inside soldering through hole 2502 in second connecting part 2703. Head part 28b is disposed on the −side of second connecting part 2703 in the Z direction, and is sized such that head part 28b cannot pass through connecting through hole 2706. An end portion of head part 28b on the +side in the Z direction is joined to the periphery of connecting through hole 2706 in the rear surface (the surface on the −side in the Z direction) of second connecting part 2703. In this manner, coil substrate 21 is surely fixed to base member 25.

Next, resin 29 is supplied to portions other than head part 28b in soldering space 2500 with a dispenser and the like. Resin 29 is a thermosetting resin such as a phenol resin and an epoxy resin, for example. In the present embodiment, resin 29 completely fills a portion on the +side of second step 2505 in the Z direction in through hole 250A.

Second step 2505 is effective for preventing outflow of unsolidified resin 29 from the opening of through hole 250A on the other end side (the −side in the Z direction).

Resin 29 covers head part 28b from the −side in the Z direction so that head part 28b of solder 28 is not exposed to the outside. Resin 29 is effective for preventing drop of dust (also referred to as solder ball) of solder 28, dust of flux and/or the like from the opening on the other end side (the −side in the Z direction) of through hole 250A to the light reception surface (the front surface on the +side in the Z direction) of the imaging device. In addition, resin 29 is also effective for preventing irregular reflection by solder 28.

Assembly of OIS Movable Part and OIS Fixing Part

When OIS fixing part 20 and OIS movable part 10 having the above-mentioned configurations are combined to assemble lens driving device 1, the other ends of (upper ends) of suspension wires 30A and 30B are respectively inserted into the pair of wire fixing parts 130a and 130b of upper spring element 13a, and fixed by soldering.

In addition, the other ends (upper ends) of suspension wires 30C and 30D are respectively inserted into the pair of wire fixing parts 130a and 130b of upper spring element 13b, and fixed by soldering.

On the other hand, one ends (lower ends) of suspension wires 30A and 30B are inserted into first through holes 260a of first wire connecting part 260s of first lead elements 26a and 26b, and fixed by soldering.

In addition, one ends (lower ends) of suspension wires 30C and 30D are inserted into second through holes 265a of second wire connecting parts 265 of second lead elements 26c and 26d, and fixed by soldering.

In addition, by applying adhesive agent to the portion surrounded by base leg part 257 in lead installation space 256 of base main body 25a, base main body 25a and cover 4 are fixed to each other. The adhesive agent is applied also to the rear surfaces of first wire connecting parts 260 of first lead elements 26a and 26b and the rear surfaces of second wire connecting parts 265 of second lead elements 26c and 26d. In this state, first wire connecting part 260 and second wire connecting part 265 function as anchors, and thus the bonding power in attaching of cover 4 to base main body 25a and the dropping-impact resistance is improved.

In the above-mentioned manner, OIS movable part 10 is supported by OIS fixing part 20 with suspension wires 30A to 30D in such a manner that OIS movable part 10 can sway in the plane orthogonal to the optical axis.

At the time of shake correction in lens driving device 1, OIS coils 22A to 22D are energized. When OIS coils 22A to 22D are energized, Lorentz forces are generated at OIS coils 22A to 22D by interaction between the magnetic field of magnet part 125 and the current flowing through OIS coils 22A to 22D (Fleming's left hand rule). This configuration is the OIS actuator (also referred to simply as actuator).

The directions of the Lorentz force (the V direction or the U direction) are orthogonal to the directions of the current (the U direction or the V direction) and the directions of the magnetic field at the long side portions of OIS coils 22A to 22D (the Z direction). Since OIS coils 22A to 22D are fixed, reactive forces act on permanent magnets 125A to 125D. With the reactive forces serving as the driving force of the OIS voice coil motor, OIS movable part 10 including magnet part 125 sways in the plane orthogonal to the optical axis, and thus shake correction is performed.

At the time of automatic focusing in lens driving device 1, AF coil part 111 is energized. When AF coil part 111 is energized, a Lorentz force is generated at AF coil part 111 by interaction between the magnetic field of magnet part 125 and the current flowing through AF coil part 111.

The direction of the Lorentz force (the Z direction) is orthogonal to the direction of the current flowing through AF coil part 111 and the direction of the magnetic field. Since magnet part 125 is fixed, a reactive force acts on AF coil part 111.

With this reactive force serving as the driving force of the AF voice coil motor, AF movable part 11 including AF coil part 111 moves in the Z direction (light axis direction), and thus focusing is performed.

Summary of the Present Embodiment

As described, lens driving device 1 according to the present embodiment includes: OIS fixing part 20 (also referred to as fixing part); OIS movable part 10 (also referred to as movable part) supported by the fixing part so as to be separated from OIS fixing part 20 in the optical axis direction and so as to be displaceable in a direction orthogonal to the optical axis direction; and an actuator configured to displace OIS movable part 10 in the direction orthogonal to the optical axis direction. OIS fixing part 20 includes: coil substrate 21 configured to hold OIS coils 22A to 22D of the actuator; base member 25 made of a non-conductive material and provided on the rear side of coil substrate 21, base member 25 including through hole 250A (first through holes 250a to 250h and described later second through holes 251a to 251d) extending from the front surface to the rear surface; and terminal member 27 made of a conductive material and partially embedded in base member 25, terminal member 27 including first connecting part 2702 connected with an external device, and second connecting part 2703 connected to coil substrate 21. Second connecting part 2703 and coil substrate 21 are connected together by solder 28 provided inside through hole 250A.

Operation and Effect of Present Embodiment

With lens driving device 1 of the present embodiment having the above-mentioned configuration, the height reduction of lens driving device 1 can be achieved. That is, in the present embodiment, terminal member 27 (coil terminal member 271 and Hall device terminal member 272) for connecting Hall devices 23A and 23B and OIS coils 22A to 22D held by coil substrate 21 and the external device is embedded in base member 25. Accordingly, the FPC as in the conventional technology disclosed in PTL 1 can be omitted. As a result, the thickness of the OIS fixing part can be reduced by the thickness of the omitted FPC, and thus height reduction of lens driving device 1 can be achieved. In addition, in this configuration, the FPC can be omitted, and therefore the number of components can be reduced. Further, in this configuration, the FPC can be omitted, and therefore assembly works for the FPC can be eliminated, and thus, the efficiency of the assembly work of the lens driving device can be improved.

In addition, as described above, soldering space 2500 opens only on the other end side (the −side in the Z direction) of first through hole 250a, and other portions thereof are surrounded by the inner peripheral surface of first through hole 250a and first land 211a. This configuration is effective for preventing outflow of solder 28.

Further, in the present embodiment, resin 29 covers the head part 28b from the −side in the Z direction so that head part 28b of solder 28 is not exposed to the outside. Resin 29 is effective for preventing drop of dust of solder 28 (also referred to as solder ball), dust of flux and/or the like from the opening on the other end side (the −side in the Z direction) of through hole 250A to the light reception surface (the front surface on the +side in the Z direction) of the imaging device. In addition, resin 29 is also effective for preventing irregular reflection by solder 28.

In addition, according to the present embodiment, the effective length of suspension wire 30 can be ensured. That is, in the present embodiment, one ends (lower ends) of suspension wires 30 are fixed to first wire connecting parts 260 of first lead elements 26a and 26b and second wire connecting parts 265 of second lead elements 26c and 26d exposed at the four corners of base member 25. In view of this, it is possible to achieve a larger effective length of suspension wire 30 in comparison with a structure in which one ends (lower ends) of suspension wires 30 are fixed to a member (e.g. coil substrate 21 or the like) disposed at a position nearer to OIS movable part 10 (that is, on the +side in the Z direction) relative to base member 25 as disclosed in PTL 1.

In particular, in the present embodiment, first wire connecting parts 260 and second wire connecting parts 265 of lead 26 are disposed at positions remote from OIS movable part 10 (that is on the −side in the Z direction) relative to first lead main bodies 261 and second lead main bodies 266 embedded in base member 25. Accordingly, it is possible to achieve a larger effective length of suspension wire 30 in comparison with the structure in which first wire connecting part 260 and second wire connecting part 265 are disposed at the same position as first lead main body 261 and second lead main body 266 in the Z direction.

In addition, with lead 26 having the above-mentioned structure, first wire connecting part 260 and second wire connecting part 265 can be disposed at positions remote from OIS movable part 10 with first lead main body 261 and second lead main body 266 completely embedded in base member 25. Thus, it is possible to achieve a larger effective length of suspension wire 30 while achieving the improvement of the coupling power of lead 26 to base member 25.

As described above, with lens driving device 1 of the present embodiment, the reliability of lens driving device 1 is improved since the effective length of suspension wire 30 can be ensured, and the rupture of suspension wire 30 due to metal fatigue can be reduced.

The module A having the above-mentioned configuration is washed in the assembled state illustrated in FIG. 2 to remove powdery materials adhered thereto in the manufacturing processes. According to new findings of the present inventor, in such a washing process, damper 15 might move to the +side in the Z direction and adhere to front end surface 121b of stopper protrusion 121.

Lens driving device 1 of the present embodiment can prevent adhesion of damper 15 to front end surface 121b of stopper protrusion 121. Specifically, in lens driving device 1 of the present embodiment, stopper protrusion 121 includes flow stopper part 121a at the side surface thereof. Flow stopper part 121a is provided at the surface that serves as a path of damper 15 moving to the +side in the Z direction in the side surface of stopper protrusion 121, and thus flow stopper part 121a serves as a resistance against displacement of damper 15 along the direction of arrow a of FIG. 11 toward the +side in the Z direction on the side surface of stopper protrusion 121, for example. As a result, adhesion of damper 15 to front end surface 121b of stopper protrusion 121 is reduced or prevented.

Additional Remark

While the invention made by the present inventor has been specifically described based on the preferred embodiment, it is not intended to limit the present invention to the above-mentioned preferred embodiment but the present invention may be further modified within the scope and spirit of the invention defined by the appended claims.

While smartphone M serving as a camera-equipped mobile terminal is described in the embodiment as an example of a camera mounting apparatus having camera module A, the present invention is applicable to a camera mounting apparatus serving as an information device or a transport device. The camera mounting apparatus serving as an information device is an information device including a camera module and a control section that processes image information obtained with the camera module, such as a camera-equipped mobile phone, a note-type personal computer, a tablet terminal, a mobile game machine, a webcamera, and a camera-equipped in-vehicle device (such as a rear-view monitor device and a drive recorder device). In addition, the camera mounting apparatus serving as a transport device is a transport device, such as an automobile, including a camera module and a control section that processes an image obtained with the camera module.

Figure 24A:
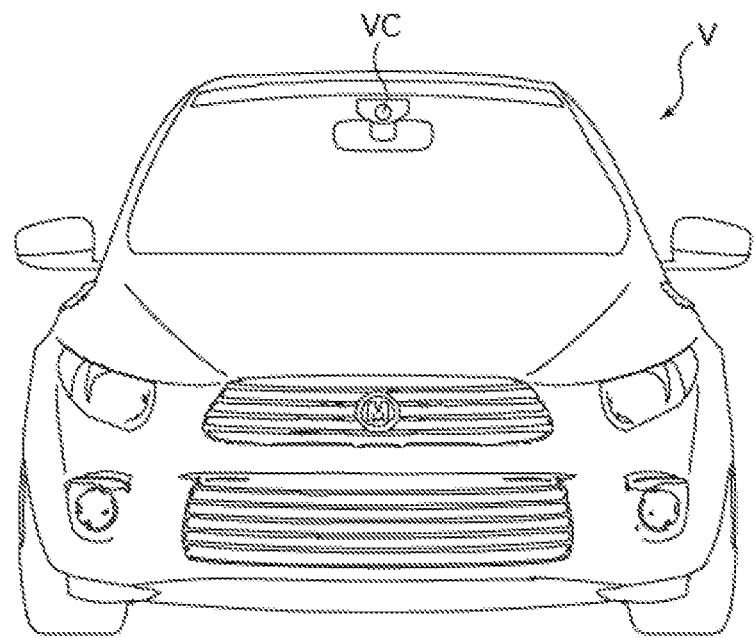
FIG. 24A and FIG. 24B illustrate an automobile serving as a camera mounting apparatus in which an in-vehicle camera module is mounted.
Figure 24B:
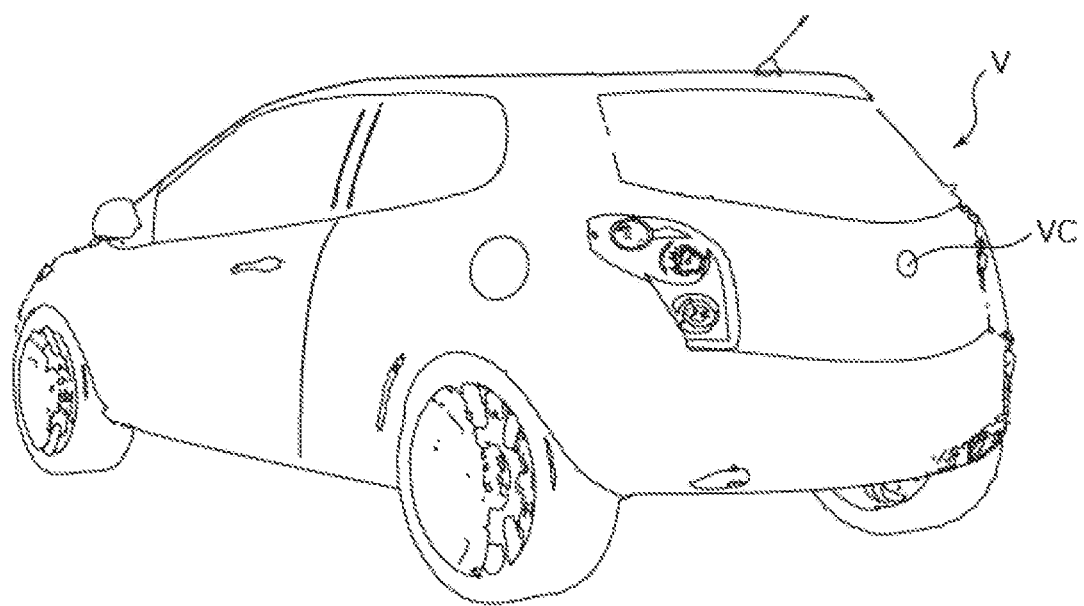

FIG. 24A and FIG. 24B illustrate automobile V serving as a camera mounting apparatus in which an in-vehicle camera module vehicle camera (VC) is mounted. FIG. 24A is a front view of automobile V, and FIG. 24B is a rear perspective view of automobile V. In automobile V, camera module A described in the embodiment is mounted as in-vehicle camera module VC. As illustrated in FIG. 24A and FIG. 24B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

INDUSTRIAL APPLICABILITY

The lens driving device, the camera module, and the camera mounting apparatus according to the embodiment of the present invention can be mounted in a slim-camera-mounting apparatus such as a smartphone, a mobile phone, a digital camera, a note-type personal computer, a tablet terminal, a mobile game machine, and an in-vehicle camera.

REFERENCE SIGNS LIST

A Camera module
M Smartphone
1 Lens driving device
10 OIS movable part
11 AF movable part
110 Lens holder
110$a$ lens housing part
110$b$ Upper flange
110$c$ Lower flange
110$d$ Coil winding part
110$e$ Upper protruding part
110$f$, 110$h$ Upper spring fixing part
110$g$, 110$i$ Upper boss
110$j$ Lower protruding part
110$k$ Lower spring fixing part
110$m$ Lower boss
110$n$ Tying part
111 AF coil part
12 AF fixing part
12$a$ Magnet holder
120$a$ Arc groove
120$b$ Magnet cover part
120$c$ Magnet installation part
120$d$ Lower spring fixing part
120$d$1 Lower boss
120$e$1, 120$e$2 Upper spring fixing part
120$f$1, 120$f$2 Upper boss
120$h$1, 120$h$2, 120$h$3, 120$h$4 Wire insertion part
121, 121A, 121B, 121C, 121D Stopper protrusion
121$a$ Flow stopper part
121$b$ End surface
121$c$ Inner surface
121$d$ Center inner surface
121$e$ Side inner surface
121$f$ Outer surface
121$g$ Outer recessed surface
121$h$, 121$h$1, 121$h$2, 121$h$3, 121$h$4 Wire opposing surface
121$i$, 121$i$1, 121$i$2, 121$i$3, 121$i$4 Side outer surface
121$k$, 121$k$1 First opposing surface
121$m$, 121$m$1 Second opposing surface
121$n$, 121$n$1 Stopper step
121$p$, 121$p$1 Side first surface
121$q$, 121$q$1 Side second surface
121$r$, 121$r$1 Side stopper step
121$s$1 Flow stopper protrusion
121$s$2 Side flow stopper protrusion
121$t$1 Flow stopper groove
121$t$2 Side flow stopper groove
121$u$1 Grain formation part
121$u$2 Side grain formation part
125 Magnet part
125A, 125B, 125C, 125D Permanent magnet
13 Upper elastic supporting part (upper leaf spring)
13$a$, 13$b$ Upper spring element
130 Outer fixing part
130$a$ and 130$b$ Wire fixing part
130$c$, 130$d$ Outer first through hole
130$e$ Outer second through hole
131 Inner fixing part
131$a$ Inner through hole
132 Displacement allowance part
132$a$, 132$b$ Displacement allowance element
132$c$, 132$d$ Meandering part
14 Lower elastic supporting part (lower leaf spring 14)
14$a$1, 14$a$2, 14$a$3, 14$a$4 Outer fixing part
140 Outer through hole
14$b$ Inner fixing part
14$c$1, 14$c$2, 14$c$3, 14$c$4 Displacement allowance part
141 Meandering part
142 Inner through hole
15 Damper
20 OIS fixing part
21 Coil substrate
21$a$ Chamfered part
21$b$ Opening
21$c$ First cutout 21d Second cutout
201A Land
211a to 211h First land
212a to 212d Second land
213A, 213B Hall device land
213a to 213h Hall device land element
22 OIS coil part
22A, 22B, 22C, 22D OIS coil
23A, 23B Hall device
25 Base member
25a Base main body
250 Opening
250A Through hole
250a to 250h First through hole
2501 Terminal installation through hole
2502 Soldering through hole
2503 Flow stopping through hole
2504 First step
2505 Second step
251a to 251d Second through hole
2500 Soldering space
252 First protrusion
253 Second protrusion
254a, 254b Hall device recess
255 Lead cutout part
256 Lead installation space
257 Base leg part
258 Second base leg part
259 First reinforcement rib
26 Lead
26a, 26b First lead element
260 First wire connecting part
260a first through hole
261 First embedding part
263a First step
26c, 26d second lead element
265 Second wire connecting part
265a Second through hole
266 Second embedded main body
266a, 266b Second embedding element
267a, 267b Second step
268 Lead terminal part
27 Terminal member
271 Coil terminal member
270A Terminal element
271a to 271d Coil terminal element
2701 Embedding part
2704 Flat plate part
2705 Step
2702 First connecting part
2703 Second connecting part
2706 Connecting through hole
272 Hall device terminal member
272a to 272h Hall device terminal element
28 Solder
28a Connecting part
28b Head part
29 Resin
30 OIS supporting part (suspension wire)
30A, 30B, 30C, 30D Suspension wire
4 Cover
40 Opening
41 Top plate part

The invention claimed is:

1. A lens driving device, comprising:
a fixing part;
a movable part disposed above the fixing part such that the movable part is separated from the fixing part in an optical axis direction, the movable part being displaceable in a direction orthogonal to the optical axis direction; and
an actuator including an Optical Image Stabilization (OIS) coil and configured to displace the movable part in the direction orthogonal to the optical axis direction;
wherein the fixing part includes:
a coil substrate configured to hold the Optical Image Stabilization (OIS) coil,
a base member made of a non-conductive material and provided below the coil substrate, the base member including a base side through hole extending in the optical axis direction, and
a terminal member made of a conductive material and partially embedded in the base member, the terminal member including a first connecting part serving as an external terminal and a second connecting part, and
wherein the second connecting part and the base side through hole are disposed to overlap each other in the optical axis direction, and the second connecting part and the coil substrate are connected by a solder provided inside the base side through hole.

2. The lens driving device according to claim 1, wherein a resin member configured to cover the solder from below is provided inside the base side through hole.

3. The lens driving device according to claim 2,
wherein the base side through hole includes a step in an inner peripheral surface of the base side through hole; and
wherein the resin member is disposed above the step inside the base side through hole.

4. The lens driving device according to claim 1,
wherein the terminal member includes a terminal side through hole in the second connecting part;
wherein the coil substrate includes a substrate side connecting part in a bottom surface of the coil substrate; and
wherein the base side through hole, the terminal side through hole, and the substrate side connecting part are disposed to overlap each other in the optical axis direction.

5. The lens driving device according to claim 1,
wherein the second connecting part is disposed at an upper end portion of the base side through hole; and
wherein a top surface of the second connecting part and a top surface of the base member are located on the same plane.

6. The lens driving device according to claim 1,
wherein the actuator further includes a Hall device configured to detect a position of the movable part,
wherein the terminal member includes a plurality of first terminal members configured to be connected with the OIS coil and a plurality of second terminal members configured to be connected with a Hall device; and
wherein the plurality of first terminal members are provided in a first half portion of the base member, and the plurality of second terminal members are provided in a second half portion of the base member.

7. The lens driving device according to claim 6, wherein the Hall device is held in the first half portion of the coil substrate.

8. The lens driving device according to claim 6,
wherein the OIS coil is held at four corners of the coil substrate, and the OIS coil comprises four OIS coils and respective four OIS coils are held at respective four corners of the coil substrate;

wherein two of the four OIS coils respectively disposed at opposing two corners are connected together;

wherein the terminal member includes two pairs of first terminal pairs, each first terminal pair including a positive electrode side terminal member configured to be connected to a positive electrode of a power source, and a negative electrode side terminal member configured to be connected to a negative electrode of the power source;

wherein the positive electrode side terminal member and the negative electrode side terminal member are included in the first terminal member; and wherein the two of the four OIS coils respectively disposed at the opposing two corners are connected with one first terminal pair of the two pairs of first terminal pairs, and another two of the four OIS coils respectively disposed at the other opposing two corners are connected with another first terminal pair of the two pairs of first terminal pairs.

9. A camera module, comprising:

the lens driving device according to claim 1;

a lens part held by a movable part lens through a barrel; and an image pickup section configured to pick up a subject image imaged with the lens part.

10. A camera mounting apparatus which is an information device or a transport device, the camera mounting apparatus comprising:

the camera module according to claim 9; and a control section configured to process image information obtained by the camera module.

* * * * *